United States Patent
Komiya et al.

(10) Patent No.: US 6,188,424 B1
(45) Date of Patent: Feb. 13, 2001

(54) LIGHT BEAM SCANNING, IMAGE FORMING APPARATUS, AND METHOD OF ADJUSTING THE IMAGE FORMING APPARATUS

(75) Inventors: Kenichi Komiya; Koji Tanimoto, both of Kawasaki; Naoaki Ide, Shizuoka; Jun Sakakibara, Tokyo, all of (JP)

(73) Assignees: Toshiba Tec Corporation, Tokyo; Kabushiki Kaisha Toshiba, Kawasaki, both of (JP)

( * ) Notice: Under 35 U.S.C. 154(b), the term of this patent shall be extended for 0 days.

(21) Appl. No.: 09/235,398

(22) Filed: Jan. 22, 1999

(30) Foreign Application Priority Data

Jan. 22, 1998 (JP) .................................................. 10-010286

(51) Int. Cl.[7] ...................................................... B41J 2/47

(52) U.S. Cl. ........................... 347/235; 347/248; 250/235

(58) Field of Search ..................................... 347/235, 250, 347/229, 234, 248; 250/235, 236, 208.1

(56) References Cited

U.S. PATENT DOCUMENTS 5,929,891 * 7/1999 Komiya et al. ...................... 347/235

* cited by examiner

*Primary Examiner*—N. Le
*Assistant Examiner*—Lamson D. Nguyen
(74) *Attorney, Agent, or Firm*—Foley & Lardner

(57) ABSTRACT

A light beam is made to scan and expose a photosensitive drum in the main scanning direction and the passing position of the light beam in the sub-scanning direction is sensed. On the basis of the result of the sensing, the light beam is shifted in the sub-scanning direction when the beam is made to scan by a scanner so that the passing position may come in a target range, which brings the passing position to the proper position. After the position control, the passing position of the light beam is confirmed and controlled so that the passing position may fall on the proper position a specific number of times consecutively. When the light beam is shifted in the sub-scanning direction, the passing position of the light beam is brought into a final target range in such a manner that the target range is forced to converge stepwise in a first range and then in a second range narrower than the first range.

17 Claims, 17 Drawing Sheets

LIGHT BEAM SCANNING, IMAGE FORMING APPARATUS, AND METHOD OF ADJUSTING THE IMAGE FORMING APPARATUS

BACKGROUND OF THE INVENTION

This invention relates to a light beam scanning apparatus for making laser light beams to scan and expose the surface of a single photosensitive drum simultaneously and thereby forming a single electro-static latent image on the photosensitive drum, an image forming apparatus, such as a digital copying machine or a laser printer, using the light beam scanning apparatus, and a method of adjusting the image forming apparatus.

In recent years, various digital copying machines have been developed which form images by, for example, scanning exposure by laser light beams (hereinafter, referred to as light beams) and electronic photographic processing.

To step up the image forming speed, the multi-beam digital copying machines have recently been developed. In this type of digital copying machine, more than one light beam is generated and they are made to scan in units of lines simultaneously.

The multi-beam digital copying machine is provided with an optical system unit acting as a light beam scanning apparatus. The optical system unit is composed primarily of semiconductor laser oscillators for generating laser beams, a polyhedral rotating mirror, such as a polygon mirror, and optical-path control means. The polyhedral rotating mirror reflects the laser beams emitted from the laser oscillators toward a photosensitive drum to make each laser beam to scan the surface of the photosensitive drum. The optical-path control means is composed of a collimator lens, an f-θ lens, and a galvanomirror for shifting the passing position of each light beam over the photo-sensitive drum in the sub-scanning direction.

With the configuration of a conventional optical system unit, it is very difficult to control the positional relationship between light beams on the surface of a photosensitive drum (the scanning surface) or to bring the passing positions of light beams into an ideal positional relationship. To achieve this, not only very high-accuracy parts and assembly but also very high-accuracy light-beam passing position control are needed, which leads to a rise in the cost of the apparatus.

Even when the light beams have been controlled so as to have an ideal positional relationship, noise can interfere with the driving lines for a light beam actuator, such as a galvanomirror, after the control, which will possibly lead to an erroneous operation of the galvanomirror, permitting the passing positions of the light beams to deviate from the target position.

In addition, there is a possibility that the passing positions of the light beams will depart from the target position due to vibration made by the image forming apparatus or externally applied vibration.

Furthermore, noise can interfere with the output of a sensor for sensing the passing position of a light beam, which will possibly perform control on the basis of erroneous information on the light beam position.

Moreover, in a light beam actuator, such as a galvanomirror, the hysteresis or sensitivity generally varies. Such variations in the hysteresis or sensitivity have an adverse effect on control of the passing positions of the light beams. For example, there is a possibility that control will vibrate and the light beams will not converge in the control target area.

BRIEF SUMMARY OF THE INVENTION

An object of the present invention is to provide a light beam scanning apparatus and an image forming apparatus which are capable of eliminating the effect of noise and bringing the passing position of a light beam to the control target position accurately.

Another object of the present invention is to provide a light scanning apparatus and an image forming apparatus which enable control of the passing position of a light beam to converge in a short time reliably, taking into account variations in the hysteresis or sensitivity of a light beam actuator, such as a galvanomirror.

Still another object of the present invention is to provide a method of adjusting an image forming apparatus which enables servicemen to easily grasp the control state of a light beam through visual inspection and facilitates the investigation and determination of the cause of inadequate images and therefore maintenance service.

In order to achieve the above objects, according to one aspect of the present invention, there is provided a light beam scanning apparatus comprising: light beam generating means for generating a light beam; scanning means for reflecting the light beam generated at the light beam generating means to a scanning surface and making the light beam to scan the scanning surface in the main scanning direction; shifting means for shifting the light beam in sub-scanning direction when the light beam is made to scan by the scanning means; light beam sensing means for sensing a passing position in the sub-scanning direction of the light beam made by the scanning means to scan the scanning surface; control means for controlling the shifting means on the basis of the result of sensing at the light beam sensing means so that the passing position of the light beam on the scanning surface may be within a target range; judging means for, after the control means has brought the passing position of the light beam on the scanning surface into the target range, measuring the passing position of the light beam scanning the scanning surface a specific number of times using the light beam sensing means and judging whether all of the passing positions lie in the target range; and re-executing means for making the control means to execute passing position control of the light beam again when the result of measuring the light beam passing position the specific number of times includes a value outside the target range.

To shift the optical path of the light beam in the sub-scanning direction, the passing position of the light beam is brought into a final target range in such a manner that the target range is forced to converge stepwise in a first range and then in a second range narrower than the first range.

According to another aspect of the present invention, there is provided an image forming apparatus which makes light beams to scan and expose an image retaining member and thereby forms an image on the image retaining member, the image forming apparatus comprising: a plurality of light beam generating means for generating light beams; scanning means for optically combining the light beams generated at the plurality of light beam generating means and then reflecting the resulting beams to a scanning surface and making the light beams to scan the scanning surface in the main scanning direction; a plurality shifting means for shifting the light beam in sub-scanning direction when the light beam is made to scan by the scanning means; a plurality of light beam sensing means for sensing passing positions in the sub-scanning direction of the light beams made by the scanning means to scan the scanning surface;

control means for controlling the plurality of shifting means on the basis of the result of sensing at the light beam sensing means so that the passing position of each of the light beams on the scanning surface may be within a target range; judging means for, after the control means has brought the passing positions of the light beams on the scanning surface into the target range, measuring the passing position of each of the light beams scanning the scanning surface a specific number of times using the light beam sensing means and judging whether all of the passing positions of the light beams lie in the target range; re-executing means for making the control means to execute passing position control of the light beams again when the result of measuring the light beam passing position of each of the light beams the specific number of times includes a value outside the target range; and image forming means for, after the judging means has judged that all of the passing positions of the light beams are within the target range, driving the plurality of light beam generating means and scanning means on the basis of an inputted target data item and forming an image on the scanning surface.

The image forming apparatus further comprises: setting means for setting the apparatus to a maintenance service mode for provide maintenance service including light beam scanning position control; and display means for displaying the controlled state of the light beam in the service maintenance mode. When an inadequate image has occurred and the light beam scanning position control is executed, or when the apparatus is maintained, the display means shows how the feed position of each light beam is being controlled. This makes it possible to easily judge which light beam has contributed to the inadequate image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
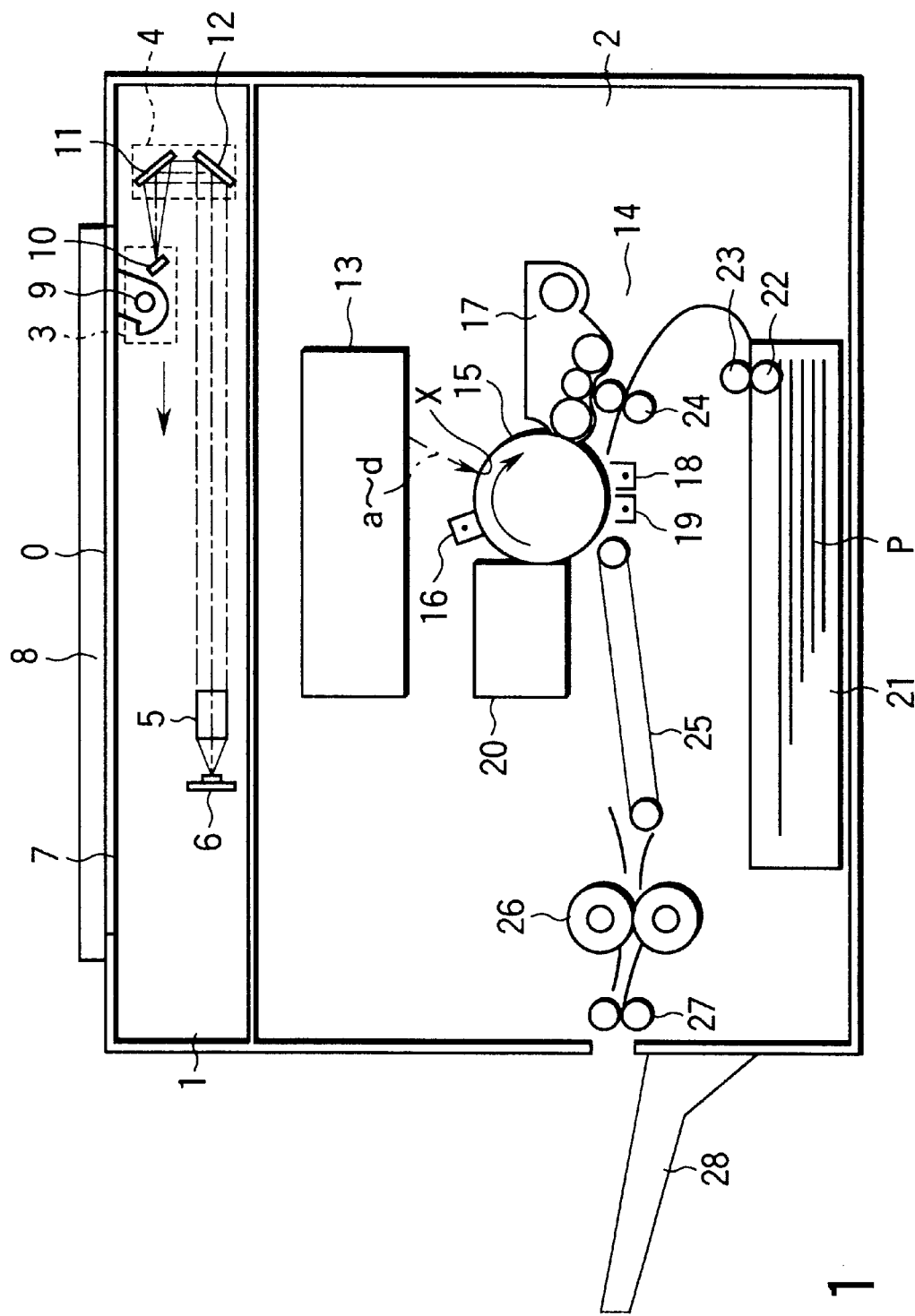
FIG. 1 schematically shows the configuration of a digital copying machine according to an embodiment of the present invention.

FIG. 1 shows the configuration of a digital copying machine, which is an image forming apparatus to which a light beam scanning apparatus according to an embodiment of the present invention is applied. The digital copying machine includes a scanner unit 1 acting as image reading means and a printer unit 2 acting as image forming means. The scanner unit 1 is composed of a first carriage 3 and a second carriage 4 which are movable in the direction of the arrow, an image formation lens 5, and a photoelectric conversion element 6.

In FIG. 1, a document O is placed on an document table 7 made of transparent glass, with the printed side downward. The placement reference of the document O is at the front right of the document table 7 in the traverse direction. A document holding cover 8 that can be opened and closed presses the document O against the document table 7.

A light source 9 illuminates the document O. The reflected light from the document passes through mirrors 10, 11, 12 and the image formation lens 5 and is gathered on the light-receiving surface of the photoelectric conversion element 6. The first carriage 3 on which the light source 9 and mirror 10 are mounted and the second carriage 4 on which the mirrors 11, 12 are mounted are designed to move at a relative speed in the ratio of 2:1. A carriage driving motor (not shown) moves the first carriage 3 and second carriage 4 from right to left in synchronization with a read timing signal.

In this way, the image of the document O on the document table 7 is read line by line by the scanner unit 1. The output of the scanner unit 1 is converted by an image processing unit (not shown) into an 8-bit digital signal indicating the gradation of image.

The printer unit 2 is composed of an optical system unit 13 and an image forming unit 14 using an electronic photographic system capable of forming an image on a sheet of paper P serving as a medium on which an image is to be formed. Specifically, the image signal read from the document O by the scanner unit 1 is processed at the image processing unit (not shown) and then converted into laser beams from semiconductor laser oscillators. The printer unit of the embodiment uses a multi-beam optical system using more than one semiconductor laser oscillator.

The configuration of the optical system unit 13 will be explained in detail later. The semiconductor laser oscillators provided in the unit emit light according to the laser modulation signal outputted from the image processing unit (not shown). The light beams from the semiconductor laser oscillators are reflected by a polygon mirror and outputted to the outside of the unit in the form of scanning light.

The light beams from the optical system unit 13 form a spot with the necessary resolution at point X, the exposure position, on a photosensitive drum 15 serving as an image retaining member. They scan and expose the surface of the photosensitive drum 15. This makes an electrostatic latent image corresponding to the image signal on the photosensitive drum 15.

Around the photosensitive drum 15, there are provided an electrifying charger 16 for electrifying the surface of the drum, a developing unit 17, a transfer charger 18, a peeling charger 19, and a cleaner 20. The photosensitive drum 15 is rotated by a driving motor (not shown) at a specific circumferential speed. It is electrified by the electrifying charger 16 facing the surface of the drum. More than one light beam (or scanning light beam) forms a spot at point X, the exposure position, on the electrified photo-sensitive drum 15.

The electrostatic latent image formed on the photosensitive drum 15 is developed with the toner (or developer) from the developing unit 17. The toner image formed on the photosensitive drum 15 is transferred at the transfer position onto the sheet P fed with a suitable timing by the paper feed system.

In the paper feed system, sheets of paper P in a paper feed cassette 21 at the bottom are taken out one by one by a supply roller 22 and a separation roller 23. The sheet P is sent to a resist roller 24, which carries the sheet to the transfer position with a specific timing. In the downstream side of the transfer charger 18, there are provided a sheet transport mechanism 25, a fixing unit 26, and delivery rollers 27 for discharging the sheet P on which an image has been formed. With this arrangement, the fixing unit 26 fixes the toner image on the sheet P on which the toner image has been transferred. Thereafter, the sheet is discharged via the delivery rollers 27 into a delivered sheet tray 28 on the outside.

After the image has been transferred from the photosensitive drum 15 to the sheet P, the remaining toner on the surface of the drum is removed by the cleaner 20, which returns the drum to the initial state. In this state, the drum stands by to form the next image.

The repetition of the aforementioned processes makes the image forming operation to be performed continuously.

As described above, the document O on the document table 7 is read at the scanner unit 1. The read data is subjected to a series of processes and then recorded on the sheet P in the form of a toner image.

The following is explanation of the optical system unit 13.

Figure 2:
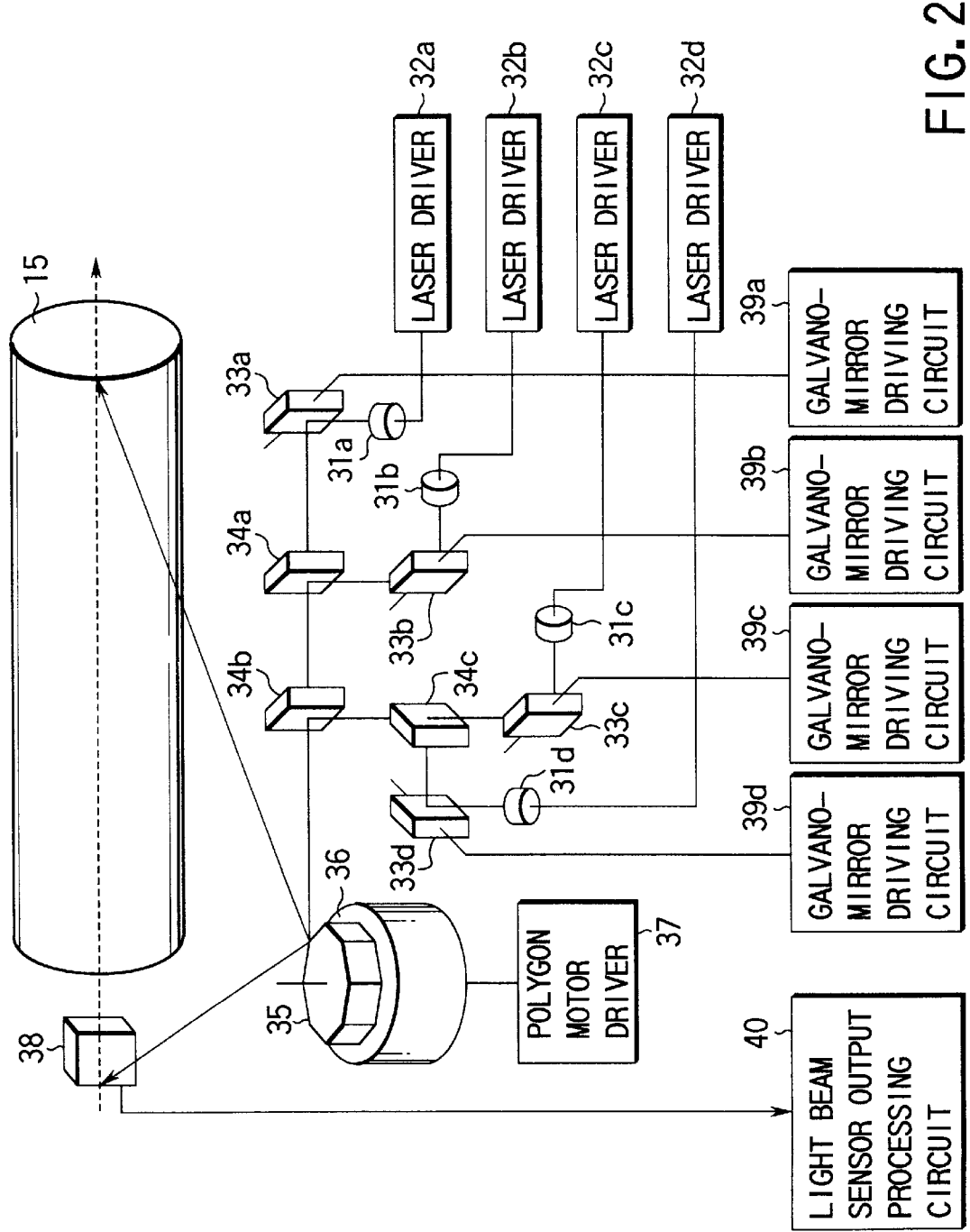
FIG. 2 shows the configuration of an optical system unit and the location of a photosensitive drum.

FIG. 2 shows the configuration of the optical system unit 13 and the location of the photosensitive drum 15. The optical system unit 13 includes, for example, semiconductor laser oscillators 31*a*, 31*b*, 31*c*, 31*d*, serving as four light beam generating means. The semiconductor laser oscillators 31*a*, 31*b*, 31*c*, 31*d* scan the respective scanning lines simultaneously, enabling an image to be formed at high speed without increasing the revolution speed of the polygon mirror.

Specifically, the laser oscillator 31*a* is driven by a laser driver 32*a*. The light beam outputted passes through a collimator lens (not shown) and strikes a galvanomirror 33*a* serving as optical path control means. The light beam reflected from the galvanomirror 33*a* passes through a half mirror 34*a* nd a half mirror 34*b* and strikes a polygon mirror 35 acting as a polyhedral rotating mirror.

The polygon mirror 35 is rotated at a constant speed by a polygon motor 36 driven by a polygon motor driver 37. This makes the reflected light from the polygon mirror 35 to scan in a constant direction at an angular velocity determined by the revolution speed of the polygon motor 36. The light beam moved to and fro by the polygon mirror 35 passes through an f-θ lens (not shown). The f-θ characteristic of the lens enables the light beam to scan the light-receiving surface of a light beam sensing unit 38 and the surface of the photosensitive drum 15 at a constant speed. The beam sensing unit 38 serves as light beam sensing means and light beam power sensing means.

The laser oscillator 31*b* is driven by a laser driver 32*b*. The light beam outputted passes through a collimator lens (not shown) and is reflected by a galvanomirror 33*b* and then by the half mirror 34*a*. The reflected light from the half mirror 34*a* passes through the half mirror 34*b* and strikes the polygon mirror 35. The optical path through which the beam travels after the polygon mirror 35 is the same as that for the laser oscillator 31*a*. Namely, the light beam passes through the f-θ lens (not shown) and scans the light-receiving surface of the light beam sensing unit 38 and the surface of the photosensitive drum 15 at a constant speed.

The laser oscillator 31*c* is driven by a laser driver 32*c*. The light beam outputted passes through a collimator lens (not shown) and is reflected by a galvanomirror 33*c*. The reflected light passes through a half mirror 34*c*, is reflected by the half mirror 34*b*, and strikes the polygon mirror 35. The optical path through which the beam travels after the polygon mirror 35 is the same as that for the laser oscillator 31*a* or 31*b*. Namely, the light beam passes through the f-θ lens (not shown) and scans the light-receiving surface of the light beam sensing unit 38 and the surface of the photosensitive drum 15 at a constant speed.

The laser oscillator 31*d* is driven by a laser driver 32*d*. The light beam outputted passes through a collimator lens (not shown) and is reflected by a galvanomirror 33*d*. The reflected light is further reflected by the half mirror 34*c* and then by the half mirror 34*b*, and strikes the polygon mirror 35. The optical path through which the beam travels after the polygon mirror 35 is the same as that for the laser oscillator 31*a*, 31*b*, or 31*c*. Namely, the light beam passes through the f-θ lens (not shown) and scans the light-receiving surface of the light beam sensing unit 38 and the surface of the photosensitive drum 15 at a constant speed.

Each of the laser drivers 32*a* to 32*d* includes an automatic power control (APC) circuit. They are designed to make the laser oscillators 31*a* to 31*d* respectively to emit light constantly at the light-emitting power level set by a main control unit (CPU) 51, which will be explained later.

The light beams from the separate laser oscillators 31a, 31b, 31c, 31d are combined at the half mirrors 34a, 34b, 34c to form four light beams, which travel toward the polygon mirror 35.

This enables the four light beams to scan the photosensitive drum 15 simultaneously. As a result, if the revolution speed of the polygon mirror 35 is the same, use of the four light beams will enable an image to be recorded at a speed four times as fast as that achieved by use of a single light beam in the prior art.

The galvanomirrors 33a, 33b, 33c, 33d are for adjusting (or controlling) the positional relationship between the light beams in the sub-scanning direction. Galvanomirror driving circuits 39a, 39b, 39c, 39d are connected to the galvanomirrors 33a, 33b, 33c, 33d respectively.

The light beam sensing unit 38 is for sensing the passing position, passing timing, and power of each of the four light beams. The unit is provided near one end of the photosensitive drum 15 in such a manner that the light-receiving surface of the unit is flush with the surface of the photosensitive drum 15. Control of the galvanomirrors 33a, 33b, 33c, 33d corresponding to the respective light beams (or image formation position control in the sub-scanning direction), control of the light-emitting power (or intensity) of the laser oscillators 31a, 31b, 31c, 31d, and control of the light emitting timing (or image formation position control in the main scanning direction) are performed on the basis of the sense signal from the light beam sensing unit 38. A light beam sensor processing circuit 40 is connected to the light beam sensing unit 38 to generate the signals for performing the above controls.

Explanation of the light beam sensing unit 38 will be given.

Figure 3:
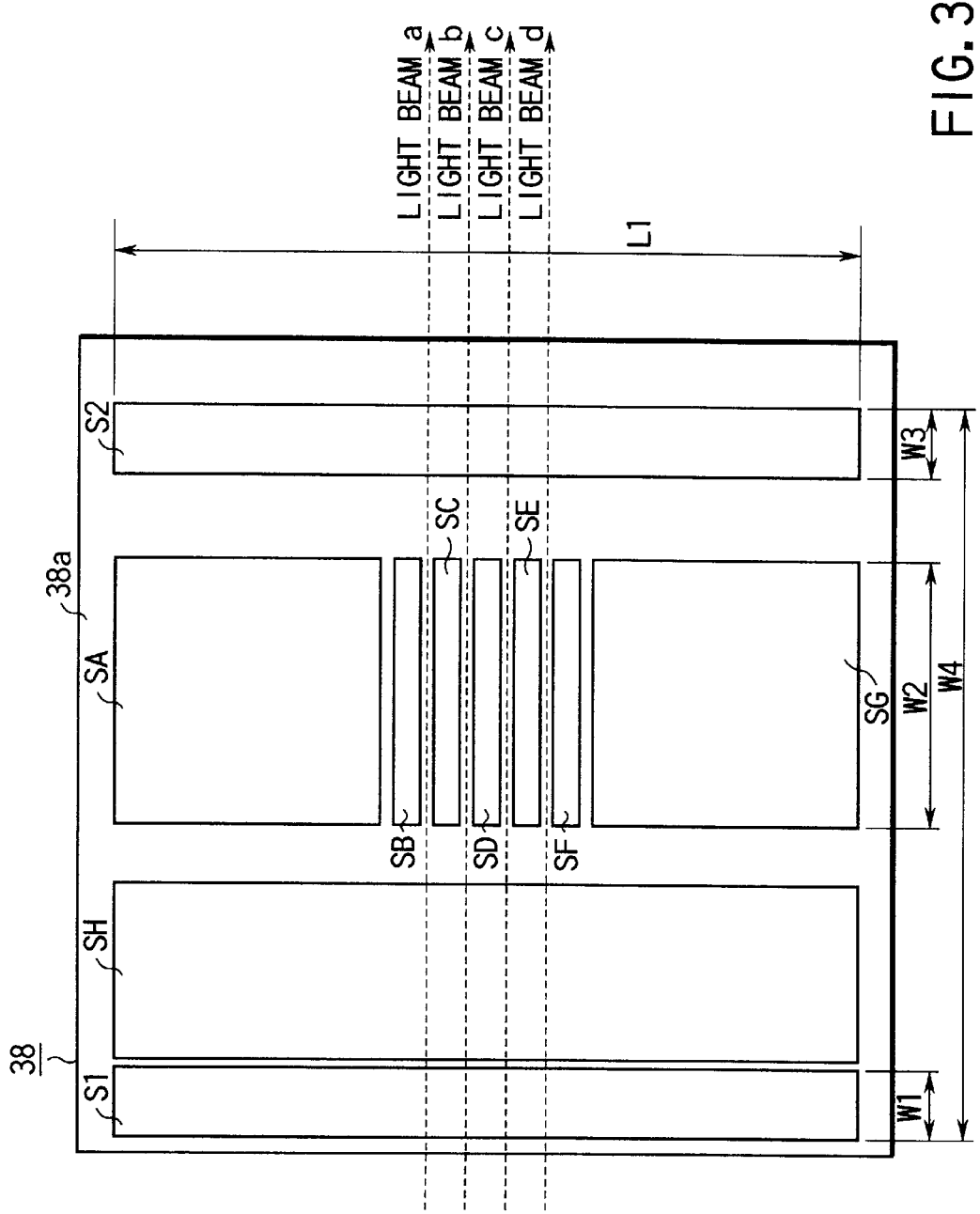
FIG. 3 schematically shows the structure of a light beam sensing unit.

FIG. 3 pictorially shows how the structure of the light beam sensing unit 38 is related to the direction in which the light beams scan. The four light beams a to d from the four semiconductor laser oscillators 31a, 31b, 31c, 31d scan, from left to right, the surface to be scanned as the polygon mirror 35 rotates, traversing over the light beam sensing unit 38.

The light beam sensing unit 38 comprises two oblong sensor patterns S1, S2, seven sensor patterns SA, SB, SC, SD, SE, SF, SG sandwiched between the two sensor patterns S1, S2, a sensor pattern SH provided next to the sensor pattern S1 (or immediately to the right of the sensor pattern S1), and a holding substrate 38a for integrally holding the sensor patterns S1, S2, SA, SB, SC, SD, SE, SF, SG, SH. The sensor patterns S1, S2, SA to SG, SH are composed of, for example, photodiodes.

The sensor pattern S1 is a pattern that senses the passing of a light beam and generates a reset signal (or an integration start signal) for an integrator explained later. The sensor pattern S2 is a pattern that senses the passing of a light beam and generates a conversion start signal for an A/D converter explained later. Each of the sensor patterns SA to SG is a pattern that senses the passing of a light beam. The sensor pattern SH is a pattern for sensing the power of a light beam.

As shown in FIG. 3, the sensor patterns S1, S2 are formed oblong in the direction perpendicular to the direction in which the light beams scan so that the light beams a to d deflected by the polygon mirror 35 never fail to traverse them, regardless of the positions of the galvanomirrors 33a to 33d. For example, in the embodiment, the width W1 and width W3 in the direction of light beam scanning are 200 $\mu$m, whereas the length L1 in the direction perpendicular to the direction of light beam scanning is 2000 $\mu$m.

The sensor patterns SA to SG are arranged in such a manner that they are stacked one on top of another in the direction in the direction perpendicular to the direction of light beam scanning between the sensor patterns S1 and S2 as shown in FIG. 3. The length along which they are arranged is L1, the same length as that of the sensor patterns S1, S2. The width W2 of each of the sensor patterns SA to SG in the direction of light beam scanning is, for example, 600 $\mu$m.

As seen from the figure, the sensor pattern SH has a length of L1, the same length as that of the sensor patterns S1, S2, and is of a sufficiently large size in the sub-scanning direction (or in the direction perpendicular to the direction of light beam scanning). When a light beam crosses the light beam sensing unit 38, it never fails to cross over the sensor pattern SH.

Explanation of the control system will be given.

Figure 4:
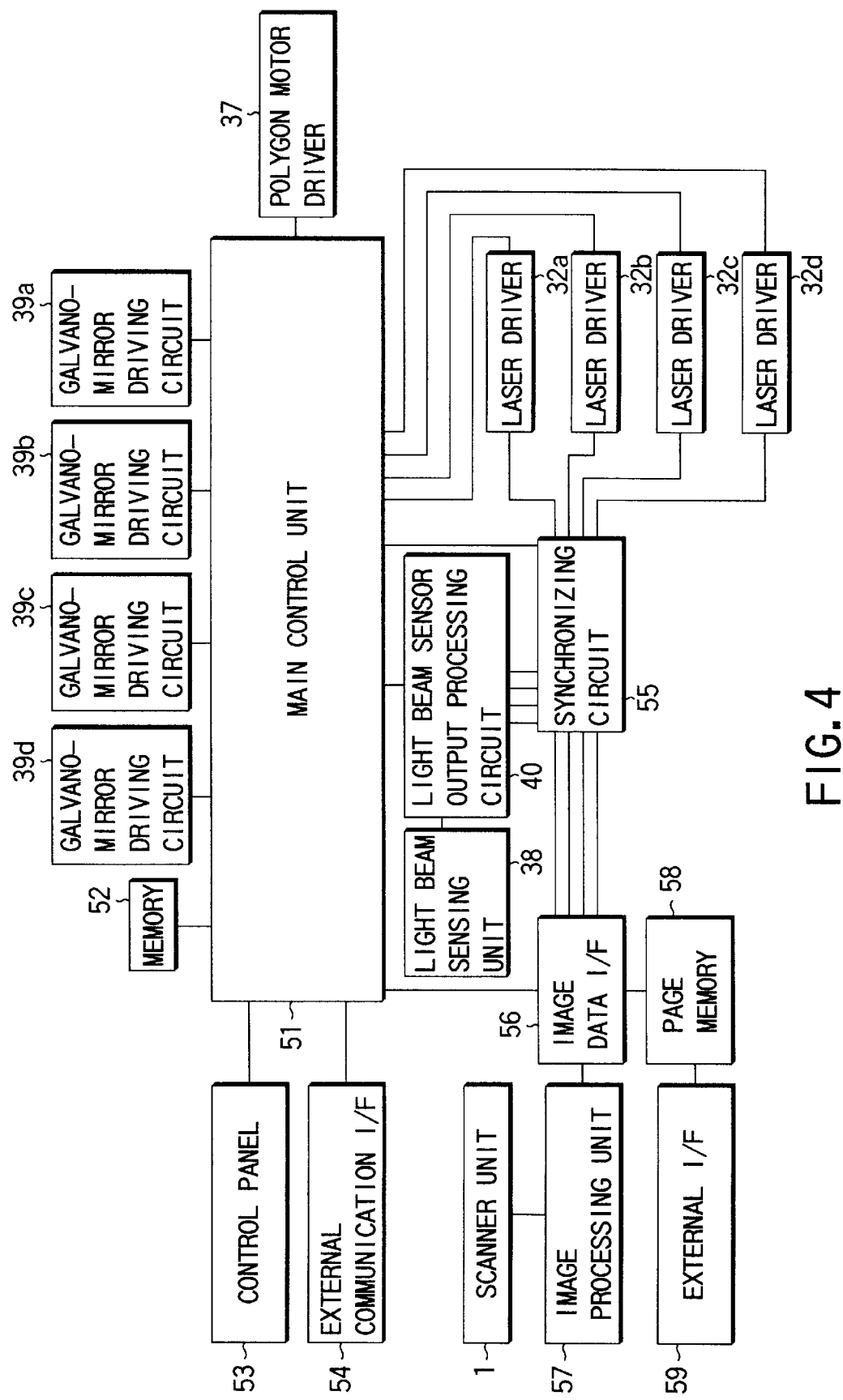
FIG. 4 is a block diagram of a control system for mainly controlling the optical system.

FIG. 4 shows the control system for mainly controlling the multi-beam optical system. Numeral 51 indicates a main control unit 51 which is composed of, for example, a CPU, and supervises the overall control. Connected to the main control unit are a memory 52, a control panel 53, an external interface (I/F) 54, the laser drivers 32a, 32b, 32c, 32d, the polygon mirror motor driver 37, the galvanomirror driving circuits 39a, 39b, 39c, 39d, the light beam sensor output processing circuit 40, a synchronizing circuit 55, and an image data interface (I/F) 56.

The image data I/F 56 is connected to the synchronizing circuit 55. An image processing unit 57 and a page memory 58 are connected to the image data I/F 56. The scanner unit 1 is connected to the image processing unit 57. An external interface (I/F) 59 is connected to the page memory 58.

The flow of image data in forming an image will be explained briefly.

As explained earlier, in a copying operation, the image of the document O on the document table 7 is read by the scanner unit 1 and the read signal is sent to the image processing unit 57. The image processing unit 57 subjects the image signal from the scanner unit 1 to known shading correction, various filtering processes, gray level processing, and gamma correction.

The image data from the image processing unit 57 is sent to the image data I/F 56. The image data I/F 56 distributes the image data to the four laser drivers 32a, 32b, 32c, and 32d.

The synchronizing circuit 55 generates a clock synchronizing with the timing with which each light beam passes over the light beam sensing unit 38 and sends the image data from the image data I/F 56 to the laser drivers 32a, 32b, 32c, and 32d as a laser modulation signal in synchronization with the clock.

Transferring the image data in synchronization with the scanning of each light beam enables an image to be formed (in the proper position) synchronously in the main scanning direction.

The synchronizing circuit 55 includes a sample timer and a logic circuit. The sample timer forces the laser oscillators 31a, 32b, 31c, 31d to emit light in non-image areas and controls the power of each light beam. The logic circuit makes the laser oscillators 31a, 32b, 31c, 31d for the respective light beams to emit light in the order of the beams over the light beam sensing unit 38 to adjust the light emitting timing of each light beam.

Here, the effect of variations in the power of a light beam on the accuracy of image formation in the main scanning direction will be explained.

In the embodiment, the light-emitting timing of each laser oscillator is controlled on the basis of the timing with which each light beam passes over the sensor pattern S1 or S2. Specifically, in FIG. 4, the output of the sensor pattern S1 or S2 of the light beam sensing unit 38 is waveform-shaped at the light beam sensor output processing circuit 40. The shaped signal is supplied to the synchronizing circuit 55 as a synchronizing signal in the main scanning direction. On the basis of the synchronizing signal, the image data I/F 56 sends the image data to the respective laser drivers 32a to 32d with the passing timing of each light beam, thereby forming the proper image.

Figure 5:
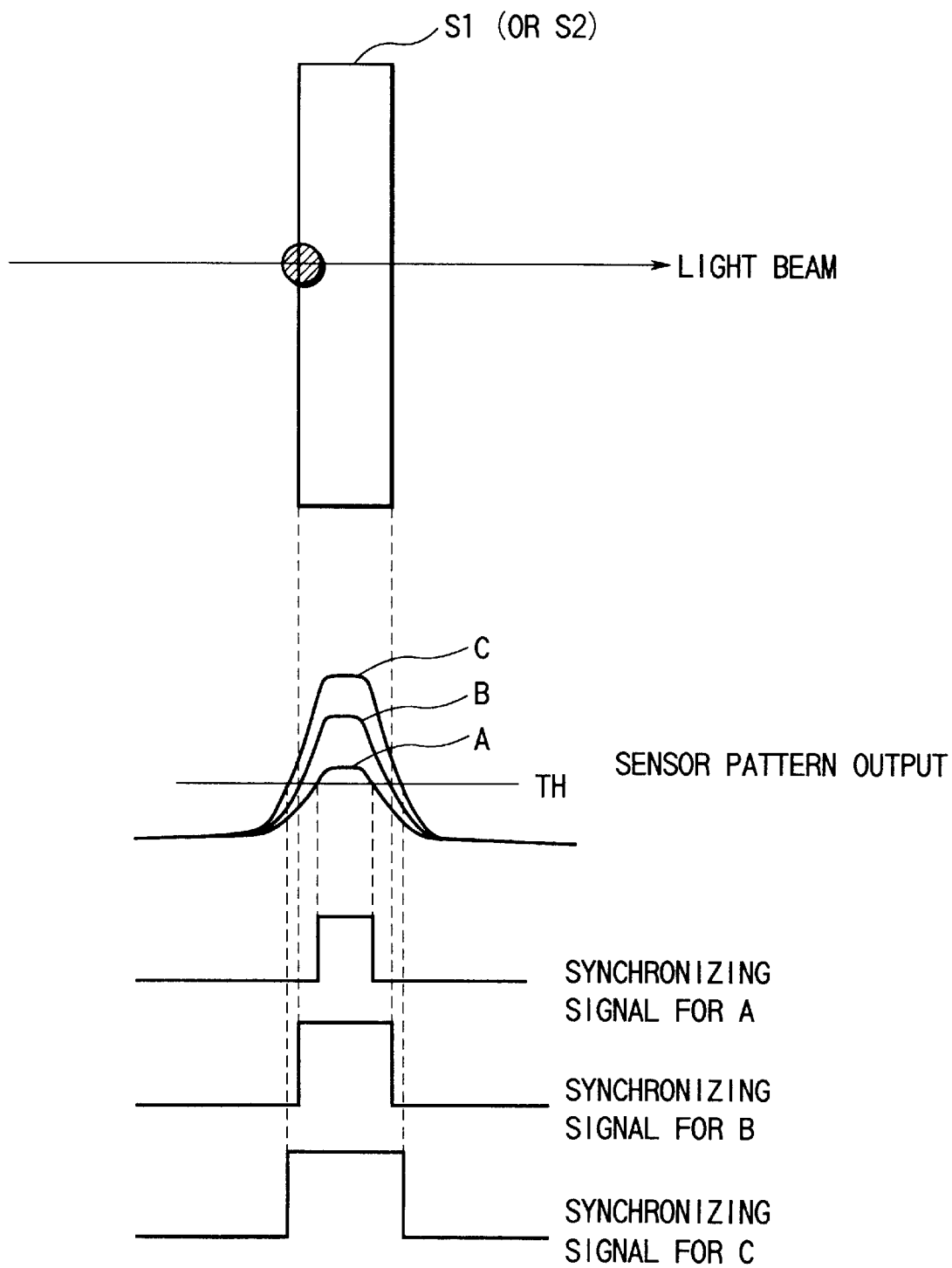
FIG. 5 is a diagram to help explain how the accuracy of image formation in the main scanning direction depends on the power of a light beam.

FIG. 5 is a diagram to help explain the dependence of the accuracy of image formation in the main scanning direction on the power of a light beam.

FIG. 5 shows sensor pattern outputs and synchronizing signals generated by waveform-shaping the outputs in a case where the power of a light beam varies in three stages (A, B, and C). The sensor pattern output (analog signal) A is obtained when the power of the light beam is low and has the lowest peak among the three outputs. The binarization (or waveform shaping) of the sensor pattern output A with a threshold level TH in the figure produces a small pulse signal (or synchronizing signal for A).

In contrast, the sensor pattern output C is obtained when the power of the light beam is high and has the highest peak among the three outputs. The binarization of the sensor pattern output C with the threshold level TH in the figure produces the largest pulse signal (or synchronizing signal for C).

The sensor pattern output B and its synchronizing signal are obtained when the power of the light beam lies between those of the sensor pattern outputs A and C.

When the laser light-emitting timing for image formation is controlled on the basis of, for example, the edges (or the rising or falling) of the three synchronizing signals A, B, and C, the images shift in the main scanning direction on the lines for which the light beams differ in power. This is because the phases of the edges of the synchronizing signals disagree with each other as shown in FIG. 5.

As explained above, to form an image with no shift in the main scanning direction by means of the multi-beam optical system, the individual light beams with the same power must scan the sensor patterns (or the photosensitive drum) for generating synchronizing signals.

In FIG. 4, the control panel 53 is a man-machine interface for starting a copying operation or setting the number of sheets of paper.

The digital copying machine of the embodiment can not only make copies but also form images from the image data externally supplied via the external I/F 59 connected to the page memory 58. The image data supplied from the external I/F 59 is temporarily stored in the page memory 58 and then sent to the synchronizing circuit 55 via the image data I/F 56.

When the digital copying machine is externally controlled via a network, the external communication I/f 54 serves as the control panel 53.

The galvanomirror driving circuits 39a, 39b, 39c, and 39d are circuits for driving the galvanomirrors 33a, 33b, 33c, and 33d according to the specified values from the main control unit 51. Therefore, the main control unit 51 can control the angles of the galvanomirrors 33a, 33b, 33d, and 33d freely via the galvanomirror driving circuits 39a, 39b, 39c, and 39d.

The polygon motor driver 37 is a driver for driving the polygon motor 36 for rotating the polygon mirror 35 that deflects the four light beams. The main control unit 51 instructs the polygon motor driver 37 to start and stop rotation of change the revolution speed. Changing the revolution speed is effected when the revolution speed is made smaller than a specific revolution speed as the need arises, in determining the passing position of a light beam with the light beam sensing unit 38.

The laser drivers 32a, 32b, 32c, 32d not only emit laser light according to the laser modulation signal synchronizing with the scanning of the light beam from the synchronizing circuit 55 but also forces the laser oscillators 31a, 31b, 31c, 31d to emit light according to the forced light-emitting signal from the main control unit 51, regardless of the image data.

The main control unit 51 sets the power produced by each of the laser oscillators 31a, 31b, 31c, 31d in the respective laser drivers 32a, 32b, 32c, 32d. The setting of the light-emitting power is changed according to changes in the processing conditions or the sensing of the passing position of the light beam.

The memory 52 is for storing the necessary data for control. It stores, for example, the controlled variables for the galvanomirrors 33a, 33b, 33c, 33d, the circuit characteristic for sensing the passing position of a light beam (or the offset value of an amplifier), and the order in which the light beams arrive. This enables the optical system unit 13 to be brought into the image formation mode immediately after the power supply has been turned on.

Using FIG. 6, the relationship between the passing positions of the light beams and the output of the A/D converter 43 will be explained.

Figure 6:
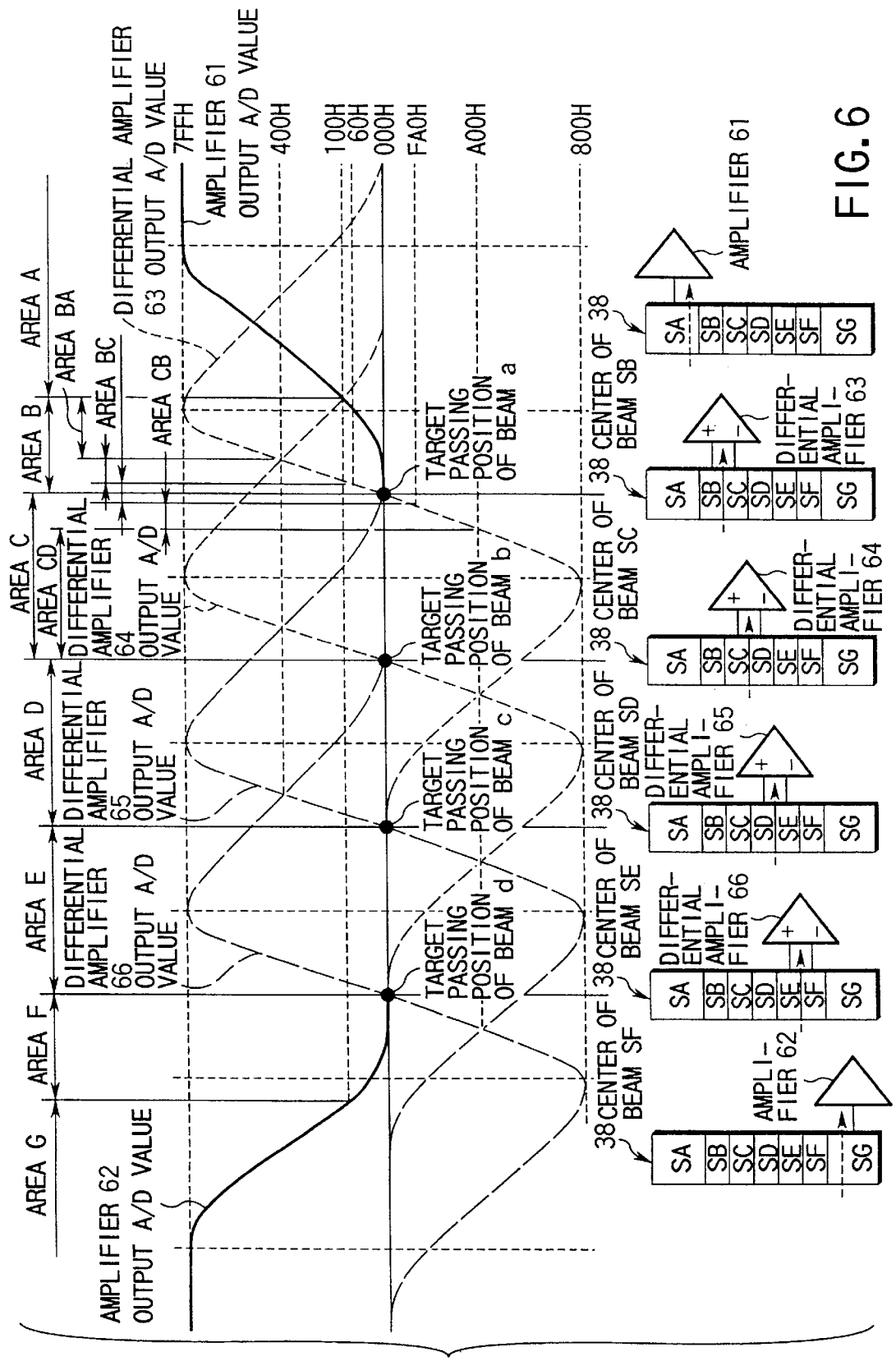
FIG. 6 is a graph showing the relationship between the passing positions of light beams and the outputs of A/D converters.
Figure 7:
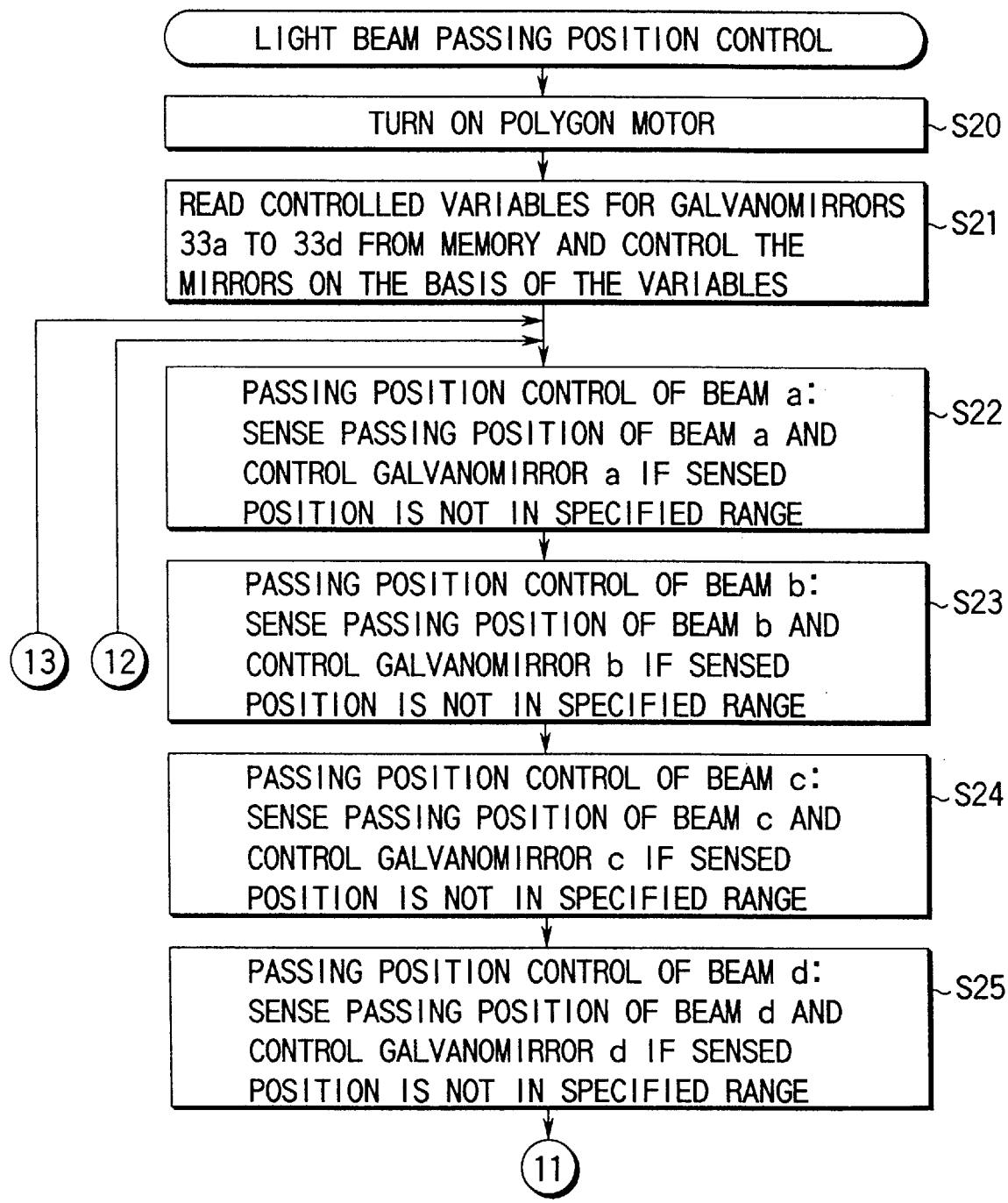
FIG. 7 is a flowchart to help explain the operation of a light beam passing position control routine according to a first embodiment of the present invention.

The vertical lines in the graph of FIG. 6 indicate the magnitude of the output of the A/D converter (containing 12 bits) 43 corresponding to FIG. 7. The horizontal line represents the passing positions of the light beams. On the horizontal line, when the passing position gets closer to the left end, it means that the light beam passes closer to the sensor pattern SG side, whereas when the passing position gets closer to the right end, it means that the light beam passes closer to the sensor pattern SA side.

There is a possibility that the outputs of the differential amplifiers (63, 64, 65, 66) will be positive or negative. Under the condition, the output of the A/D converter 43 is as follows. In a case where the outputs of the differential amplifiers (63, 64, 65, 66) are positive, as the outputs of the differential amplifier get larger, the output (or A/D converted value) of the A/D converter 43 increases in the range from 000H (the minimum value) to 7FFH (the maximum value).

On the other hand, when the outputs of the differential amplifiers (63, 64, 65, 66) are negative, the output (or A/D converted value) of the A/D converter 43 is in the range from 800H (the minimum value) to FFFH (the maximum value). In this case, the output of the differential amplifier with a larger absolute value corresponds to the 800H (the minimum value) side and that with an absolute value closer to 0 corresponds to FFFH (the maximum value) side.

The case where the output of the differential amplifier 63 for the sensor patterns SB and SC is A/D converted by the A/D converter 43 will be explained concretely.

The output of the sensor pattern SB is connected to the positive terminal of the differential amplifier 63 and the output of the sensor pattern SC is connected to the negative terminal of the differential amplifier 63. Consequently, as shown in FIG. 6, the output of the differential amplifier 63 reaches the maximum when the light beam passes near the center of the sensor pattern SB. At that time, the A/D converter 43 produces an A/D converted value of 7FFH because the output of the sensor pattern SB becomes the largest near the center of the sensor pattern SB.

When the light beam shifts from the passing position toward either the sensor pattern SA side or the sensor pattern SC side, the A/D converted value (or the output of the differential amplifier 63) decreases.

When the passing position of the light beam shifts toward the sensor pattern SA side, neither the sensor pattern SB nor SC can sense the passing of the beam, with the result that the A/D converted value (the output of the differential amplifier 63) becomes almost "0."

In contrast, when the passing position of the light beam shifts toward the sensor pattern SC side, the A/D converted value (or the output of the differential amplifier 63) decreases gradually and reaches "0" when the light beam passes through the mid-point between the sensor patterns SB and SC. This is because the output of the sensor pattern SB becomes equal to that of the sensor pattern SC at that time. In the embodiment, that point is the target passing point for the light beam a.

When the passing position of the light beam shifts further toward the sensor pattern SC side, the output of the differential amplifier 63 becomes negative, with the result that the A/D converted value changes from 000H to FFFH. Thereafter, the A/D converted value decreases gradually. When the passing position of the light beam approaches the center of the sensor pattern SC, the output of the differential amplifier 63 becomes the maximum on the negative side. At this time, the A/D converted value is 800H.

When the passing position of the light beam shifts further toward the sensor pattern SD side, the output of the differential amplifier 63 has a smaller negative value, with the result that the A/D converted value increases from 800H and finally changes from FFFH to 000H. This is because the passing position of the light beam has shifted too much toward the sensor pattern SD (SE) side, which prevents the sensor patterns SB and SC from sensing the passing of the beam, with the result that both the sensor patterns SB, SC have an output of "0", making no difference between them.

Figure 8:
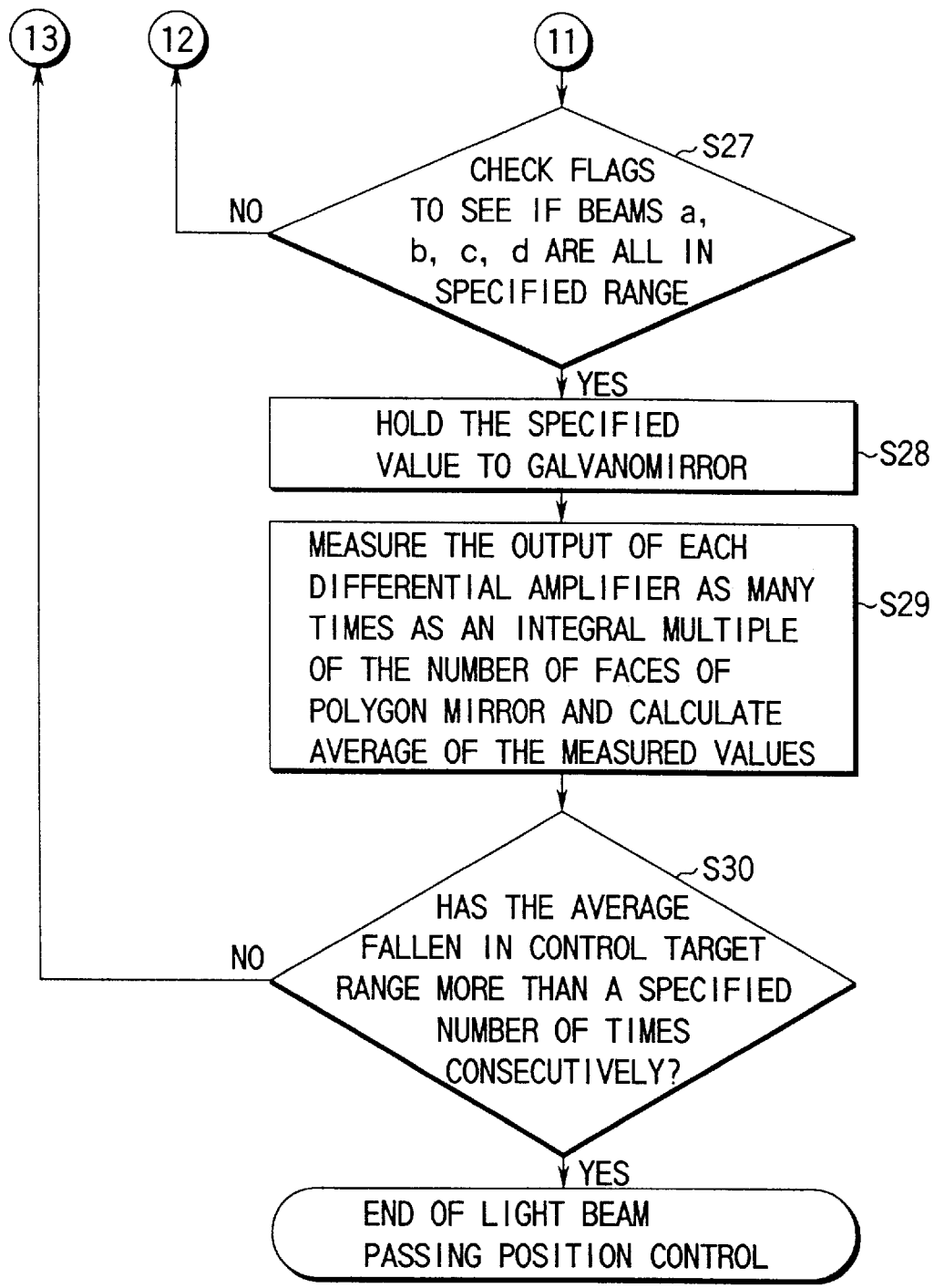
FIG. 8 is a flowchart to help explain the operation of a light beam passing position control routine according to the first embodiment.

FIGS. 7 and 8 are flowcharts to explain light beam passing position control according to the first embodiment.

The main control unit 51 first turns on the polygon motor 36, thereby rotating the polygon mirror 35 at a specific revolution speed (S20). Then, the main control unit 51 reads the latest driving values for the galvanomirrors 33a to 33d from the memory 52 and drives the galvanomirrors 33a to 33d on the basis of the values (S21).

Next, the main control unit 51 controls the passing position of the light beam a (S22). In the control operation, the unit 51 senses the passing position of the light beam a, checks whether the passing position is in a specified range of values. If it is not in the specified range, the unit 51 will change the angle of the galvanomirror 33a. If it is in the specified range, the unit 51 will set a flag indicating that the passing position of the beam a is in the specified range.

Then, the main control unit 51 senses the passing position of each of the light beams b, c, d as in the case of the beam a and checks whether the passing position is within the specified range of values. If it is not in the specified range, the unit 51 will change the angle of each of the galvanomirrors 33b to 33d. If it is in the specified range, the unit 51 will set a flag indicating that the passing position of each beam is in the specified range (S23, S24, S25).

However, noise can interfere with the driving line for the light beam actuator, or the galvanomirror, after the completion of the control. As a result, there is a possibility that the galvanomirror will operate erroneously and the passing position of the light beam deviate from the target position. There is another possibility that noise will interfere with the output of the light beam sensing unit 38 and control be performed on the basis of the erroneous light beam position information.

To overcome the problems, the first embodiment checks the final control position of the light beam and continues control until the value of the position has been obtained more than a predetermine number of times consecutively, which thereby eliminates the effect of noise, bringing the passing position of the light beam to the control target position.

After the process at step S25 has been completed, the main control unit 51 proceeds to step S27. At step S27, it checks whether all of the passing positions of the light beams a, b, c, d are in a specified range. If all of them are not in the specified range, the main control unit 51 returns to step S22 and repeats the above-described operation.

At step S27, when all of the passing positions are in the specified range, the main control unit 51 goes to step S28. At step S28, it stores the specified value to the galvanomirror and proceeds to step S29. At step S29, the main control unit 51 makes each light beam to scan the scanning surface as many times as an integral multiple of the number of faces of the polygon mirror 35 and takes the average of the outputs of each of the differential amplifiers 63 to 66. That is, the unit first makes beam a to scan, for example, eight times (the number of faces of the polygon mirror), takes the average of the outputs of the differential amplifier 63, and stores the result. It performs the same operation for each of beam b to beam d.

Next, at step S30, the main control unit 51 judges whether the average value at step S29 has fallen in the control target range the specified number of times (for example, ten times) consecutively. If the average value has not, the unit 51 will return control to step S22 and repeat the same operation. If the value has, the unit 51 will complete the light beam passing position control.

Next, light beam passing position control according to a second embodiment of the present invention will be explained.

Figure 9:
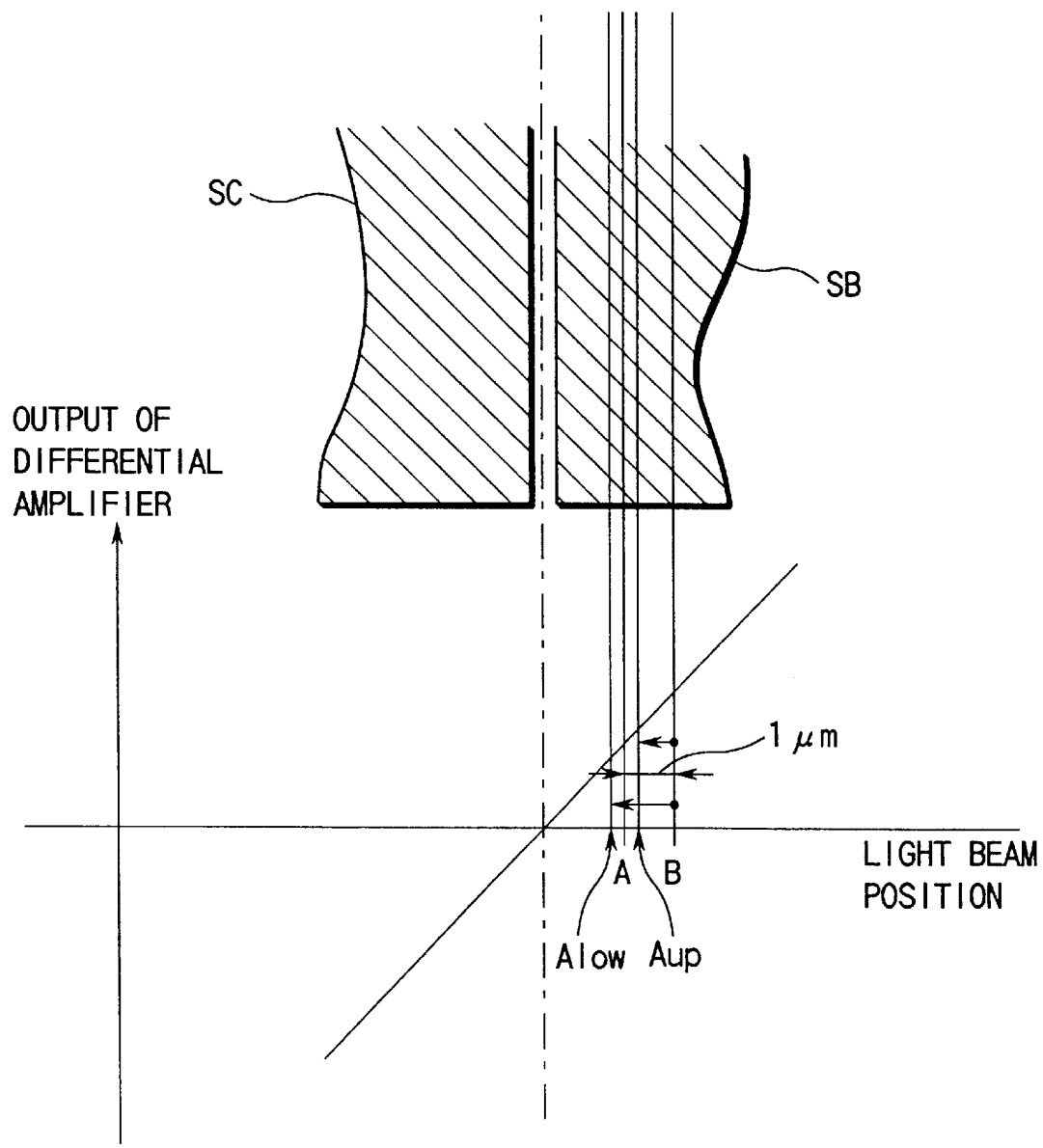
FIG. 9 is a diagram to help explain the hysteresis of the galvanomirror.

In general, a light beam actuator, such as a galvanomirror, has hysteresis, which will be described by reference to FIG. 9. In FIG. 9, the light beam a is passing point A. At this time, when the main control unit 51 gives the galvanomirror an instruction to move the passing position of light beam a 1 µm toward the sensor pattern SB, this makes light beam a to pass position B 1 µm closer to the sensor pattern SB than position A.

Next, when the main control unit 51 gives the galvanomirror an instruction to move the passing position of light beam a 1 µm toward the sensor pattern SC, this is to make light beam a to pass position A. Actually, however, it sometimes passes position Aup closer to the sensor pattern SB than position A or sometimes passes position Alow closer to the sensor pattern SC than position A. The reason is that the galvanomirror has hysteresis. Position Aup corresponds to the case where the position has moved less than 1 µm in spite of 1 µm being specified. Position Alow corresponds to the case where the position has moved more than 1 µm in spite of 1 µm being specified.

Such hysteresis is an phenomenon caused by, for example, the spring in the movable section of the galvanomirror and has the following adverse effect in passing position control of light beams.

Figure 10:
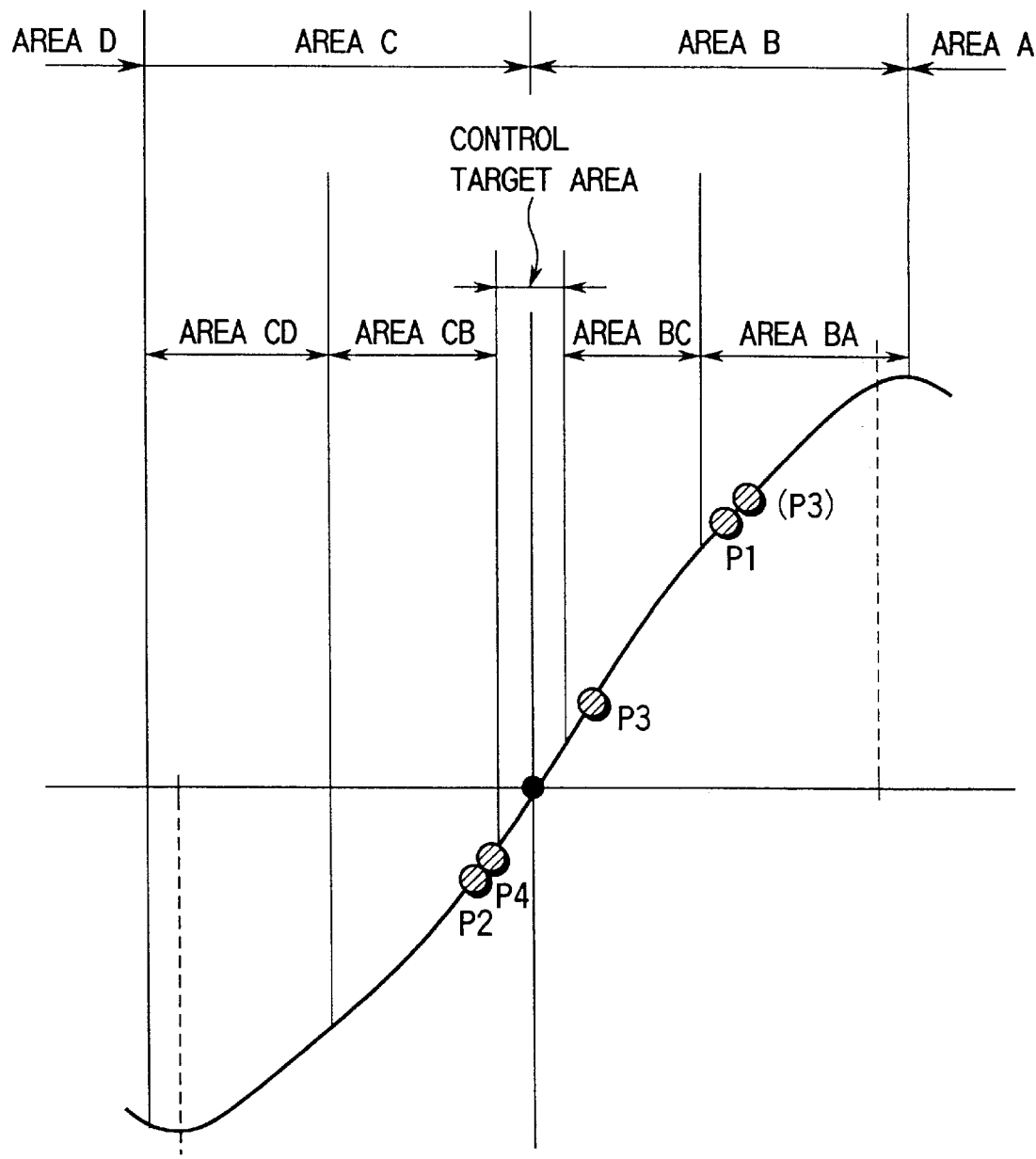
FIG. 10 is a diagram to help explain light beam passing position control according to a second embodiment of the present invention.

For example, when light beam a is in area BA (the position of point P1) as shown in FIG. 10, the main control unit 51 gives the galvanomirror 33a an instruction to move light beam a about 10 μm toward the sensor pattern SG. Namely, the unit 51 controls the galvanomirror so that light beam a may pass through area BC or the target area.

However, there may be a case where the galvanomirror 33a has moved more than a desired value because of variations in the sensitivity of the galvanomirror 33a and light beam a has moved as far as area CB or CD (or light beam a has moved from point P1 to point P2). In this case, although light beam a is to be brought in the target area, the effect of the hysteresis can permit light beam a to move as far as area BC or BA (or to move from point P2 to P3).

Specifically, moving the light beam in the opposite direction, such as in the direction of sensor pattern SG and then in the direction of sensor pattern SA, makes control oscillate, which could prevent the light beam from converging in the control target area.

Small oscillatory components have been superposed on the output of the differential amplifier in FIG. 6. As a result, when the light beam is near the boundary of each sensor, such as area C or area B, control is liable to oscillate. As explained in connection with the effect of variations in the hysteresis or sensitivity, the changes are that control will not converge in the control target area.

Taking into account variations in the sensitivity of the galvanomirror and the effect of the hysteresis, the second embodiment enables passing position control of light beams to converge in a short time reliably.

Figure 11:
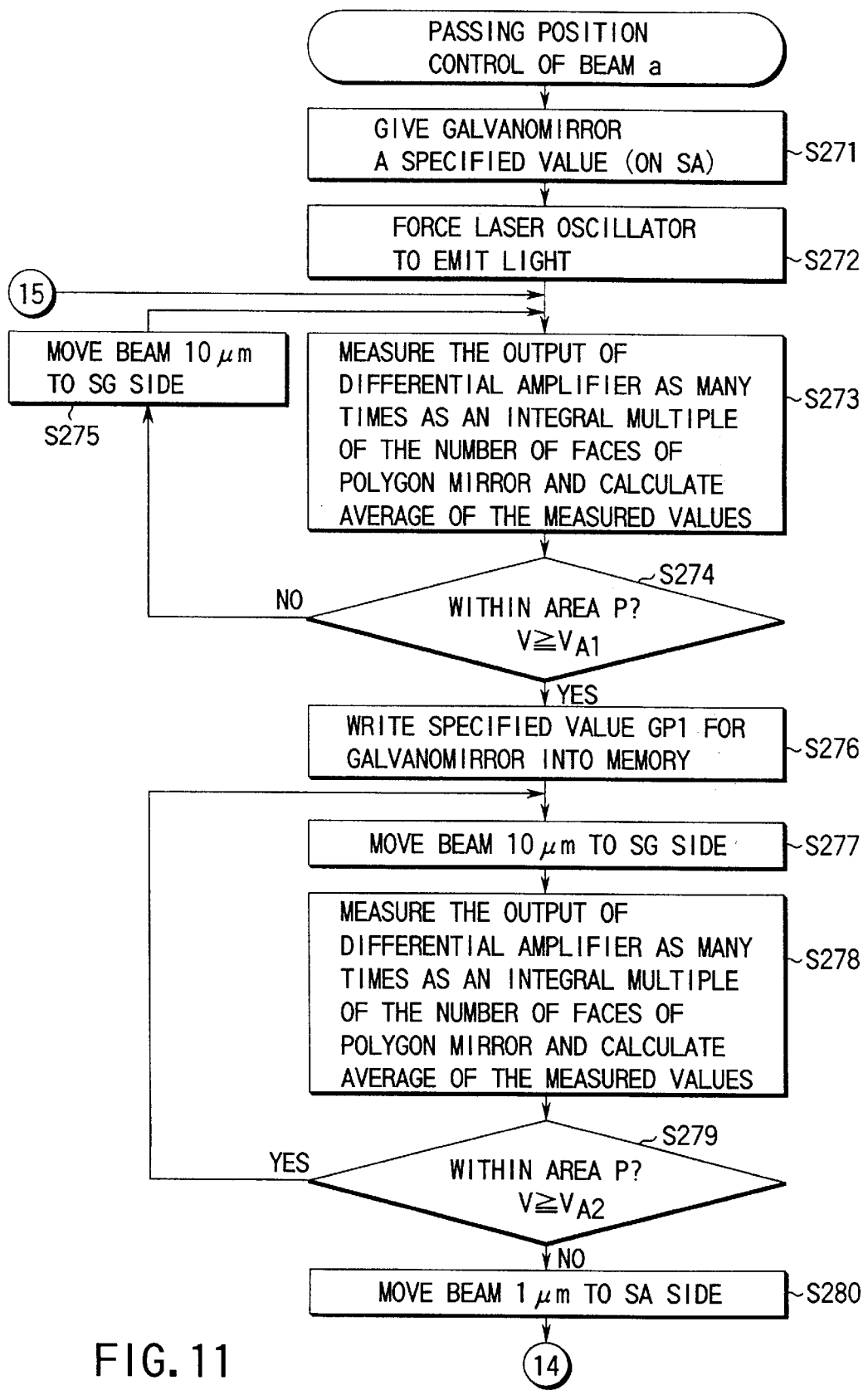
FIG. 11 is a flowchart to help explain the operation of a light beam passing position control routine according to the second embodiment.
Figure 12:
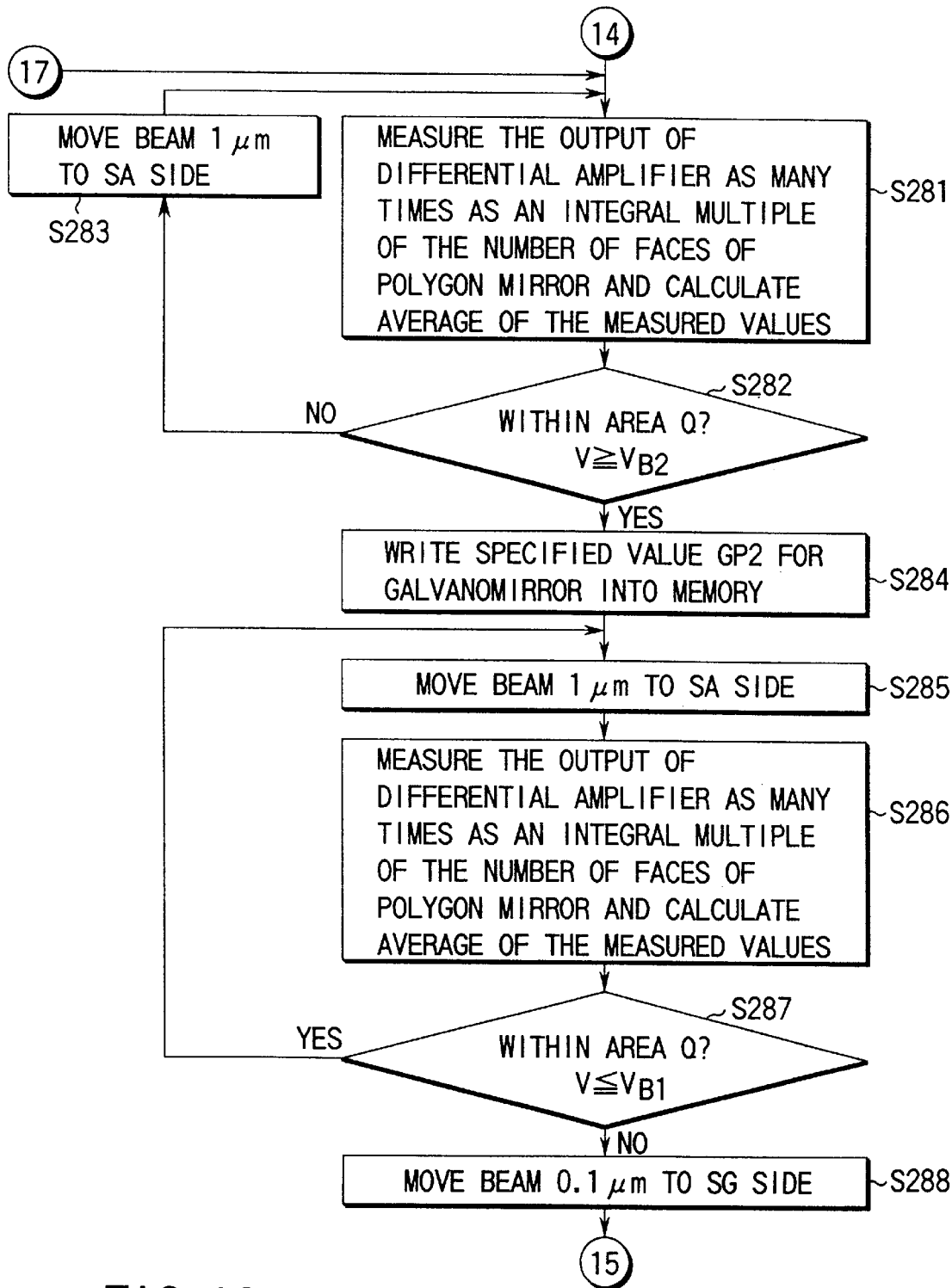
FIG. 12 is a flowchart to help explain the operation of the light beam passing position control routine according to the second embodiment.
Figure 13:
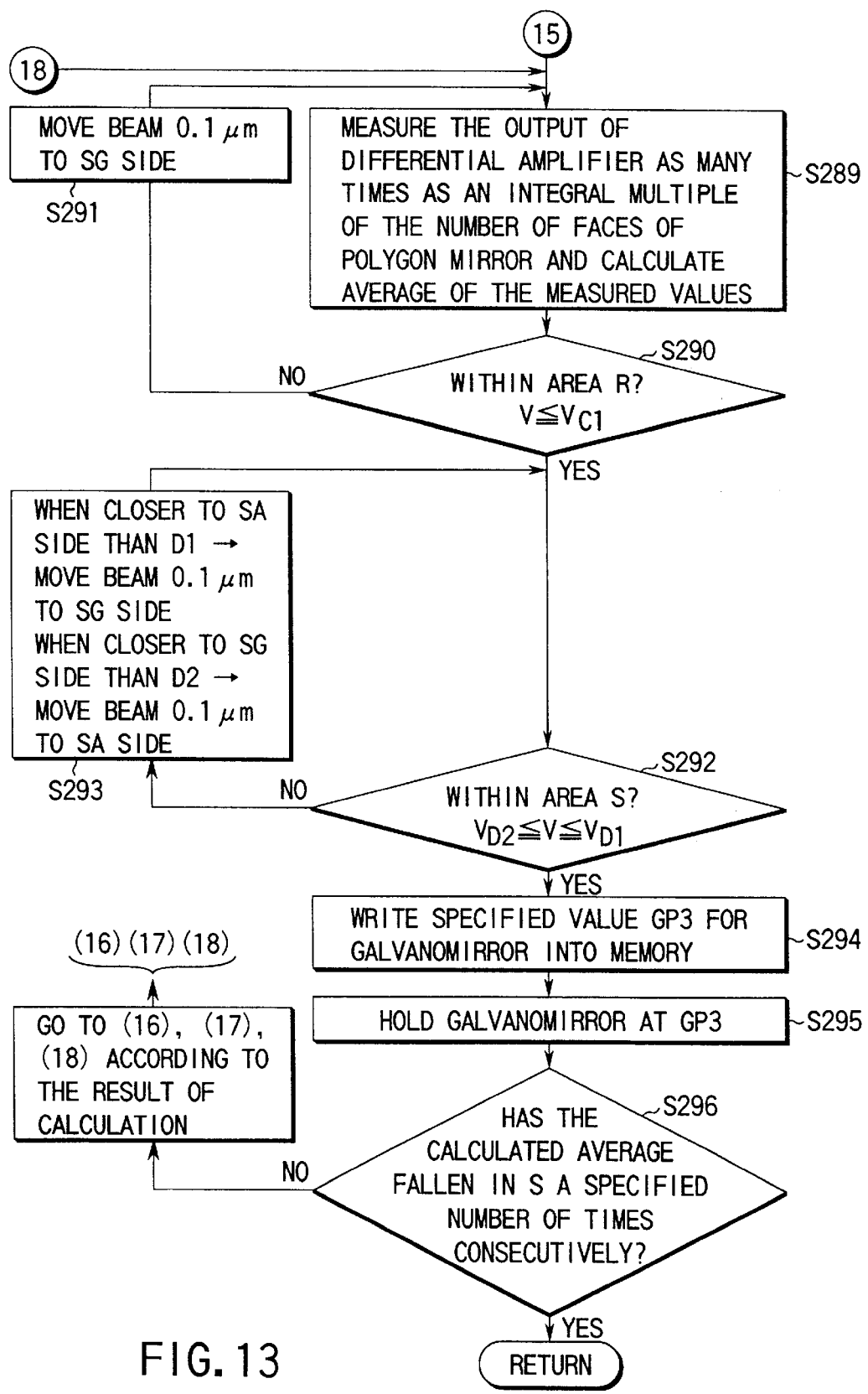
FIG. 13 is a flowchart to help explain the operation of the light beam passing position control routine according to the second embodiment.
Figure 14:
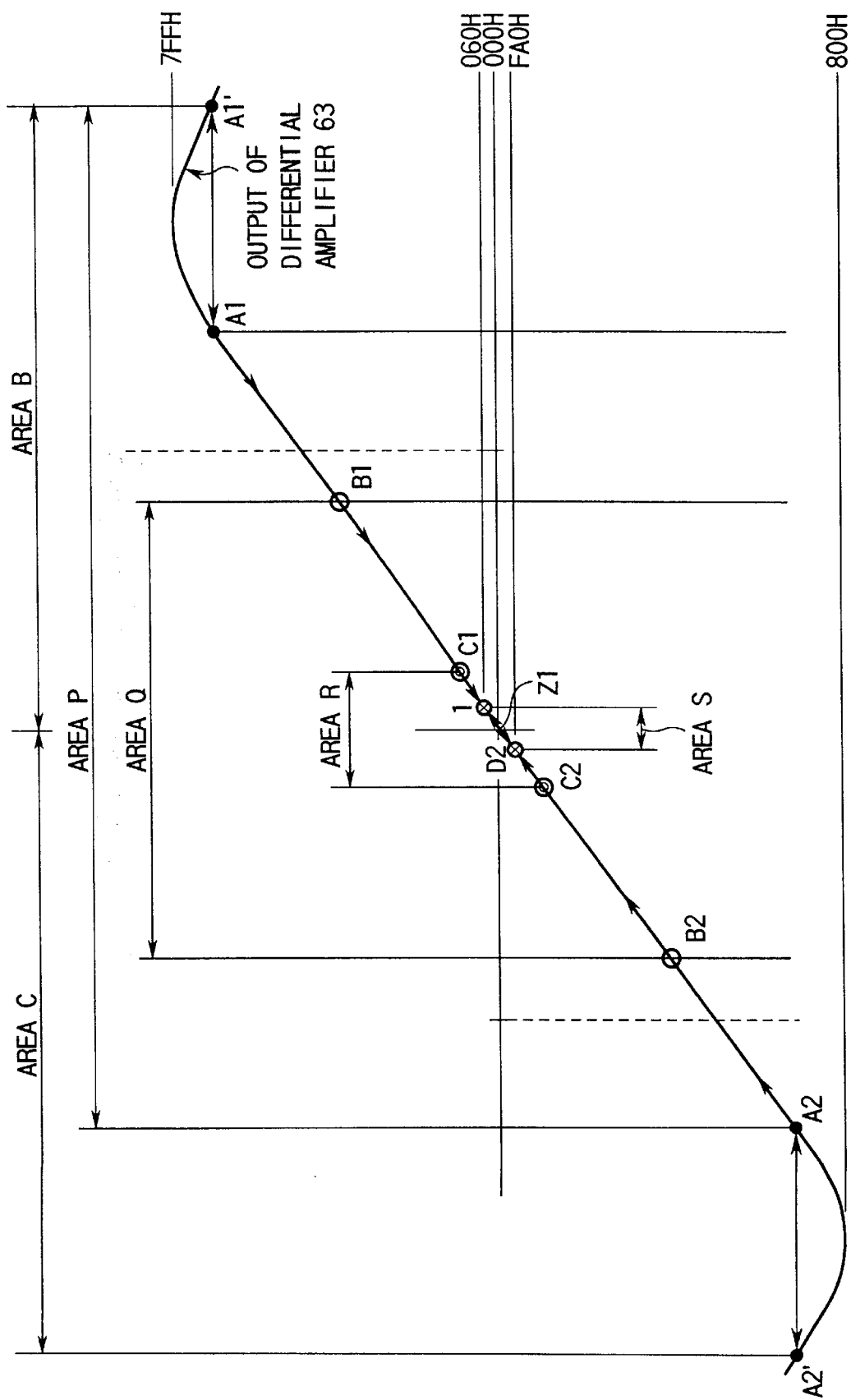
FIG. 14 is a diagram to help explain light beam passing position control according to the second embodiment.

FIGS. 11 to 13 are flowcharts to help explain light beam passing position control according to the second embodiment. FIG. 14 shows the relationship between the beam position and the output of the differential amplifier. A case where passing position control of light beam a will be explained.

The main control unit 51 gives the galvanomirror 33a such a specified value as allows light beam a to pass area A of FIG. 6 (S271). Next, the unit 51 forces the laser oscillator 31a to emit light (S272), scans the scanning surface, and measures the output of the differential amplifier 63. Specifically, the output of the differential amplifier 63 is integrated by the integrator 42 and the integrated signal is A/D converted by the A/D converter 43. The unit 51 measures the output as many times as an integral multiple of the number of faces of the polygon mirror 35 and takes the average of the outputs (S273).

Next, to put light beam a in area P of FIG. 14, light beam a is driven into the area sandwiched by points A1 and A1'. Light beam a is moved toward the sensor pattern SG until the average output integral value V (A/D converted value) of the differential amplifier 63 calculated at step S273 has reached the value $V_{A1}$ corresponding to point A1 or more ($V \geq V_{A1}$).

To find area P in this way, light beam a is moved in a 10-μm pitch. It is important that the movement pitch is smaller than the distance between point A1 and point A1'. Specifically, it is necessary for light beam a not to jump over the area from point A1 to point A1' in one movement (one pitch) but to reliably find the area sandwiched by point A1 and point A1'.

Area P of FIG. 14 is an area including Z1, the ideal target passing position of light beam a (the target passing position Z1 is a position at which the output of the differential amplifier becomes zero). The operation of driving light beam a into area P is for capturing the target passing position Z1 reliably. The output of the differential amplifier 63 in FIG. 6 becomes zero (or about zero) not only at the target passing position Z1 but also in area A and area E to area G of FIG. 6. When light beam passing position control has been carried out, light beam a might have been brought inadvertently into area A or area D to area G. To solve this problem, light beam a is driven into area P of FIG. 14 and then fine adjustments are made.

If the result of the judgment at step S274 shows NO, this means that light beam a has not passed through area P and the main control unit 51 therefore will control the galvanomirror 33a so that light beam a may move 10 μm toward the sensor pattern SG (S275). Thereafter, the unit 51 will judge again whether light beam a is in area P. The unit 51 repeats the operation until light beam a has passed through area P.

If the result of the judgment at step S274 shows YES, the unit 51 will search for point A2. Specifically, when light beam a has passed through area P, the unit 51 writes the specified value GP1 of the galvanomirror 33a into the memory 52 (S276) and moves light beam a 10 μm toward the sensor pattern SG (S277). Then, the unit 51 proceeds to step S278, where the unit 51 takes the average in the same manner as in step 273.

Next, at step S279, point A2 is searched for on the basis of the result of calculation at step S278. Because of the configuration of the light beam sensing unit 38, point A2 also has point A2' as point A1 has point A1'. Therefore, light beam a is first driven into the area sandwiched by point A2 and point A2'.

Specifically, on the basis of the result of calculation at step S278, the unit 51 judges whether the average output integral value (A/D converted value) V of the differential amplifier 53 is $V_{A2}$ or more ($V \geq V_{A2}$) (step 279). The unit 51 then moves light beam a toward the sensor pattern SG until the expression $V < V_{A2}$ is fulfilled (step S277). When the light beam passing position is near point A2, the output of the integrator 42 is negative. When light beam a is in the negative region, the larger the absolute value of the output of the integrator 42, the smaller the A/D converted value. To search for point A2, light beam a is moved in a 10-μm pitch. It is important that the pitch here is smaller than the distance between point A2 and point A2'. Specifically, it is necessary for light beam a not to jump over the area from point A2 to pointA2' in one movement (one pitch) but to reliably find the area sandwiched by point A2 and point A2'.

If the result of the judgment at step S279 shows NO, this means that light beam a is a little closer to the sensor pattern SG than point A2. At this time, the routine for driving light beam a into area P is completed.

Next, the main control unit 51 drives light beam a into area Q. Because light beam a is now passing near point A2, the unit 51 controls the galvanomirror 33a so that light beam may move 1 μm toward the sensor pattern SA (S280). Then, the unit 51 proceeds to step S281, where the unit 51 takes the average in the same manner as in step S273.

Then, at step S282, the main control unit 51 searches for point B2 on the basis of the result of calculation at step S281. Specifically, on the basis of the result of calculation at step S281, the unit 51 judges whether the average integral value V of the differential amplifier 63 is VB2 or more. If the result of the judgment at step S282 shows NO, this means that light beam a has not passed through area Q and the main control unit 51 therefore will control the galvanomirror 33a so that light beam a may move 1 μm toward the sensor pattern SA (S283). Thereafter, the unit 51 will judge again whether light beam a is in area Q. The unit 51 repeats the operation until light beam a has passed through area Q.

If the result of the judgment at step S282 shows YES, the unit 51 will drive light beam a into area R. Specifically, when light beam a has passed through area Q, the unit 51 writes the specified value GP2 of the galvanomirror 33a into the memory 52 (S284) and moves light beam a 1 μm toward the sensor pattern SA (S285). Then, the unit 51 proceeds to step S286, where the unit 51 takes the average in the same manner as in step S273.

Next, at step S287, point B1 is searched for on the basis of the result of calculation at step S286. Specifically, on the basis of the result of calculation at step S286, the unit 51 judges whether the average voltage V of the differential amplifier 63 is $V_{B1}$ or more. If the result of the judgment at step S287 shows YES, this means that light beam a has passed through area Q and the main control unit 51 therefore will control the galvanomirror 33a so that light beam a may move 1 μm toward the sensor pattern SA (S285). Thereafter, the unit 51 will judge again whether light beam a is in area Q. The unit 51 repeats the operation until light beam a has passed outside area Q.

If the result of the judgment at step S287 shows NO, light beam a has passed a little closer to the sensor pattern SA than point B1. At this time, the routine for driving light beam a into area Q is completed.

Next, to drive light beam a into area R, the main control unit 51 moves light beam a in a 0.1-μm pitch, the smallest movement of the galvanomirror 33a, toward the sensor pattern SG (S288). Then, the unit 51 proceeds to step S289, where the unit 51 takes the average in the same manner as in step S273.

Then, at step S290, the main control unit 51 searches for point Cl on the basis of the result of calculation at step S289. Specifically, on the basis of the result of calculation at step S289, the unit 51 judges whether the average voltage V of the differential amplifier 63 is $V_{C1}$ or below. If the result of the judgment at step S290 shows NO, this means that light beam a has not passed through area R and the main control unit 51 therefore will control the galvano-mirror 33a so that light beam a may move 0.1 μm toward the sensor pattern SG (S291). Thereafter, the unit 51 will judge again whether light beam a is in area R. The unit 51 repeats the operation until light beam a has passed through area R.

If the result of the judgment at step S290 shows YES, the main control unit 51 will judge whether light beam a has passed through area S, the final control target range (S292). If light beam a has not passed through area S, the unit 51 will move light beam a in a 0.1-μm pitch and continue control until light beam a has passed through area S (S293).

Specifically, if light beam a has passed closer to the sensor pattern SA than point D1, the main control unit 51 will move light beam a 0.1 μm toward the sensor pattern SG. Conversely, if light beam a has passed closer to the sensor pattern SG than point D2, the unit 51 will move light beam 0.1 μm toward the sensor pattern SA.

If the passing position of light beam a is in area S, the main control unit 51 will write the specified value of the galvanomirror 33a into the memory 52 (S294) and hold the galvanomirror 33a in that position (S295). Then, the unit 51 will further do calculations like those at step S273 and judge whether light beam a is in area D (S296). In the case, if the result of calculations (the average value) has shown that light beam a has passed through area S a specific number of times consecutively, the main control unit 51 will end passing position control of light beam a. That is, control will be completed when the passing position of light beam a has stayed in area D continuously during the specific number of measurements.

Figure 15:
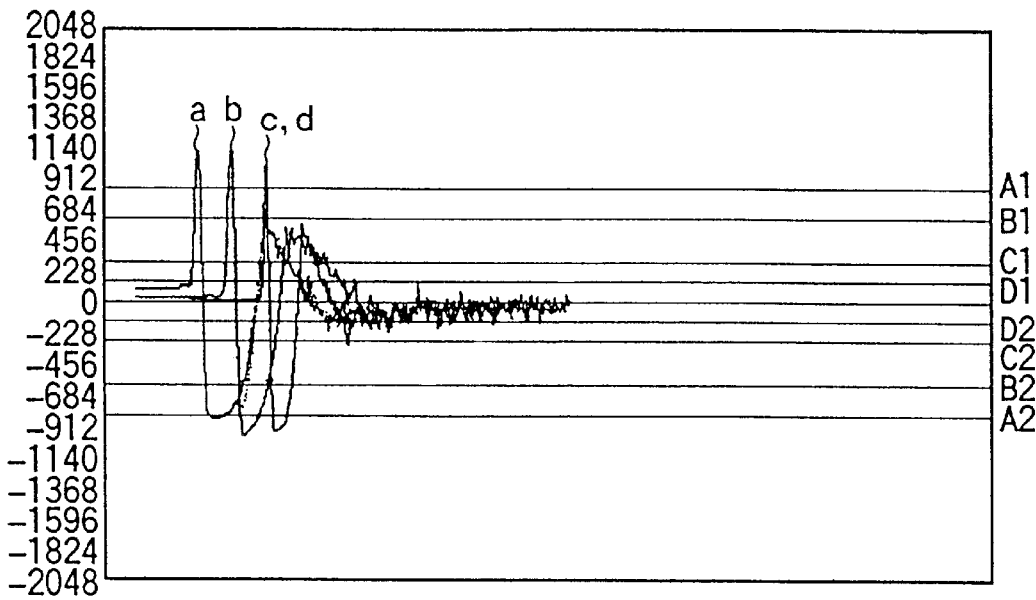
FIG. 15 shows an example of the outputs of a differential amplifier when light beam passing position control according to the second embodiment has been executed.

FIG. 15 shows the result of performing the above-described control for the four beams a to d. The vertical line indicates values obtained by integrating the output of the differential amplifier 63 at the integrator 42 and A/D converting the integration result at the A/D converter 43. A1, B1, C1, D1, D2, C2, B2, and A2 at right correspond to A1, B1, C1, D1, D2, C2, B2, and A2 of FIG. 14. The horizontal line is the time axis.

Hereinafter, a third embodiment of the present invention will be explained.

In the multi-beam image forming apparatus, when the problem of inadequate images has occurred, it is very difficult to identify the causes of the problem. The reason is that the optical system of this type is composed of a large number of component parts, including light sources, actuators for these light sources, multi-beam lenses, and light beam sensing units, as compared with that of the single-beam type. When at least one of the component parts has failed, an inadequate image will appear.

A typical example of an inadequate image is a jittery image where a pattern of horizontal stripes appears on the screen. This phenomenon takes place when the pitch between horizontal lines is not a desired one. In the case of a conventional image forming apparatus with an optical system of the single beam type, the cause of an inadequate image is easily identified as trouble with the driving system, including the photosensitive drum.

In the case of an image forming apparatus with an optical system of the multi-beam type, however, abnormality can occur in the component parts constituting the multi-beam optical system, including laser oscillators, light beam sensing units, and actuators, in addition to abnormality in the driving system.

Namely, the pitch between the individual beams (equivalent to the pitch between horizontal lines on the image) is not a desired one before the image is formed on the photosensitive drum. The reason is that passing position control of the light beam has not been performed properly.

The malfunction of the actuator, or the galvanomirror, is considered to be one of the causes. Malfunction here means that the galvanomirror does not work as instructed by the main control unit. This is made chiefly by a defect in the actuator, such as the breaking of the coil of the actuator, or the malfunction of the actuator driver.

A second one of the causes is the malfunction of the laser oscillator (or the laser diode). Specifically, the laser oscillator wouldn't emit light as instructed by the main control unit. This results from the failure of the laser oscillator or the malfunction of the laser driver.

A third one of the causes is the malfunction of the light beam sensing unit. Specifically, such data items as the passing position of the light beam, the passing timing, or the power (amount of light) of the light beam cannot be acquired. This is caused mainly by the failure of electronic parts, such as operational amplifiers, constituting the sensor or the sensor board, or an inadequate mounting of the sensor board on the optical system.

In the case of the malfunction of the actuator or laser oscillator, because a plurality of component parts are used, the number of causes increases (in the case of a 4-beam configuration, four laser oscillators, four laser drivers, four actuators, and four actuator drivers are used).

As described above, in the case of the image forming apparatus with the multi-beam system, the number of causes of inadequate images is larger than in the single-beam system, which makes it more difficult to identify the causes. As a result, it will take a lot of time for maintenance service, which will put the user to great inconvenience.

When it is difficult for a serviceman to cope with the problem, it will take a long time to repair and maintain the image forming apparatus, which will cause great inconvenience to the user.

With the image forming apparatus with the multi-beam system according to the third embodiment, selecting the service maintenance mode makes it possible to display the results of the light beam passing position control operation and the power sensing operation. This facilitates the investigation and identification of the causes of poor images, improving maintainability.

With the third embodiment, selecting the maintenance service mode enables a control operation as shown in FIG. 15 to be displayed on the control panel 53 of FIG. 4. This enables the serviceman to visually check the state of light beam passing position control or the state of power sensing control easily.

Hereinafter, the third embodiment of the present invention will be explained.

For example, when a user informs the service center of an inadequate image (e.g., jitter), a serviceman is dispatched to the user to investigate the cause and troubleshoot the apparatus. The serviceman selects the service maintenance mode on the control panel 53. Then, a screen to display the state of light beam passing position control appears on the display section of the control panel 53. The serviceman then executes light beam passing position control. As a result, the above-described light beam passing position control is carried out. At that time, on the display section of the control panel 53, a screen shown in FIG. 16 appears.

Figure 16:
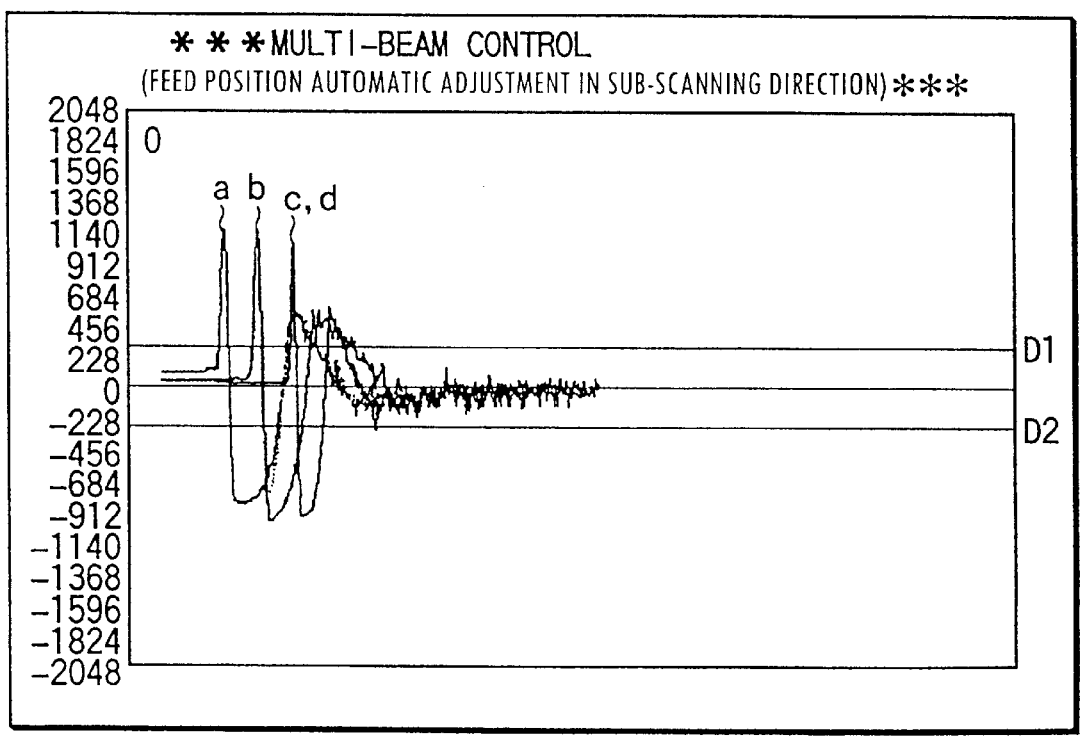
FIG. 16 shows an example of a display screen according to a third embodiment of the present invention.

FIG. 16 shows the state of a light beam passing position control operation. It will be understood that all of the light beams a, b, c, and d have been brought into the areas D1 to D2, the control target range. Specifically, it is expected that the light beam passing position control has been completed properly and at least the laser oscillators, light beam sensing units, galvanomirror, and lenses constituting the multi-beam system unit have been working correctly. As a result, there is a strong possibility that the cause of inadequate image (jitter) will be the malfunction of the photosensitive drum driving system. The serviceman judges the state easily and troubleshoots the driving system.

Figure 17:
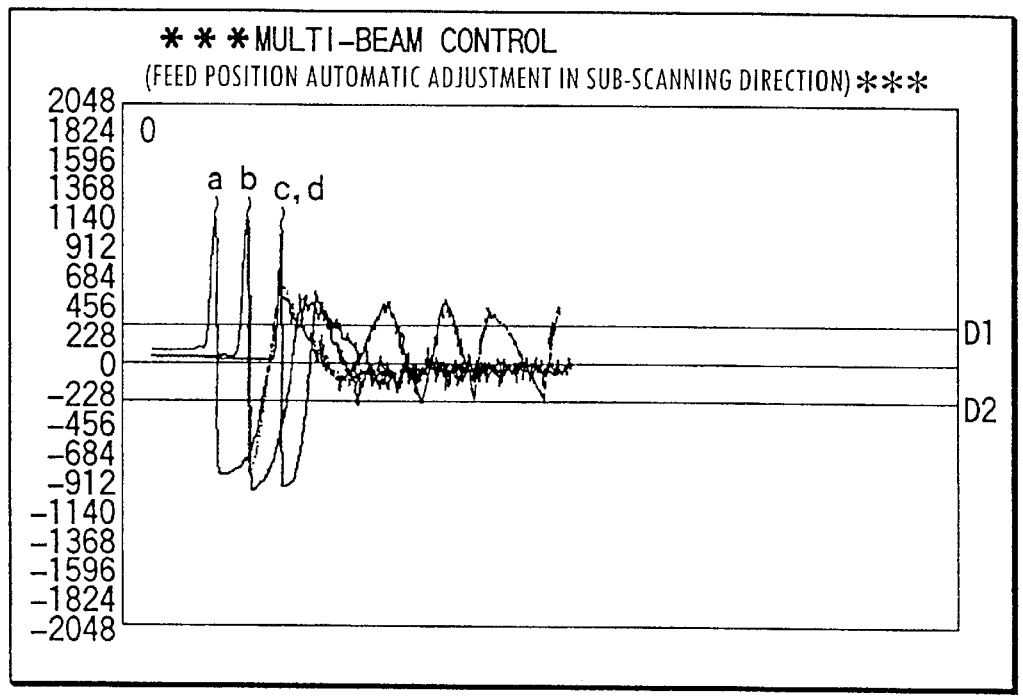
FIG. 17 shows an example of the display screen according to the third embodiment.

When a screen shown in FIG. 17 has appeared on the display section of the control panel 53, there is a good chance that the component parts of the multi-beam system unit will be the cause of jitter.

FIG. 17 shows a case where light beam a has not converged in the control target range and the light beam passing position control has ended abnormally. The representation on the screen has showed that the mechanism related to light beam a has contributed to jitter. Specifically, because the behavior of light beam a is oscillatory, there is a good chance that either the galvanomirror 33a for light beam a or its driving circuit 39 has malfunctioned. Therefore, the serviceman judges the above state from FIG. 17 and troubleshoots the apparatus.

The representation of light beam passing position control enables the serviceman to visually investigate the causes of inadequate images and take swift measures to deal with the problem, which is helpful in maintenance service.

Figure 18:
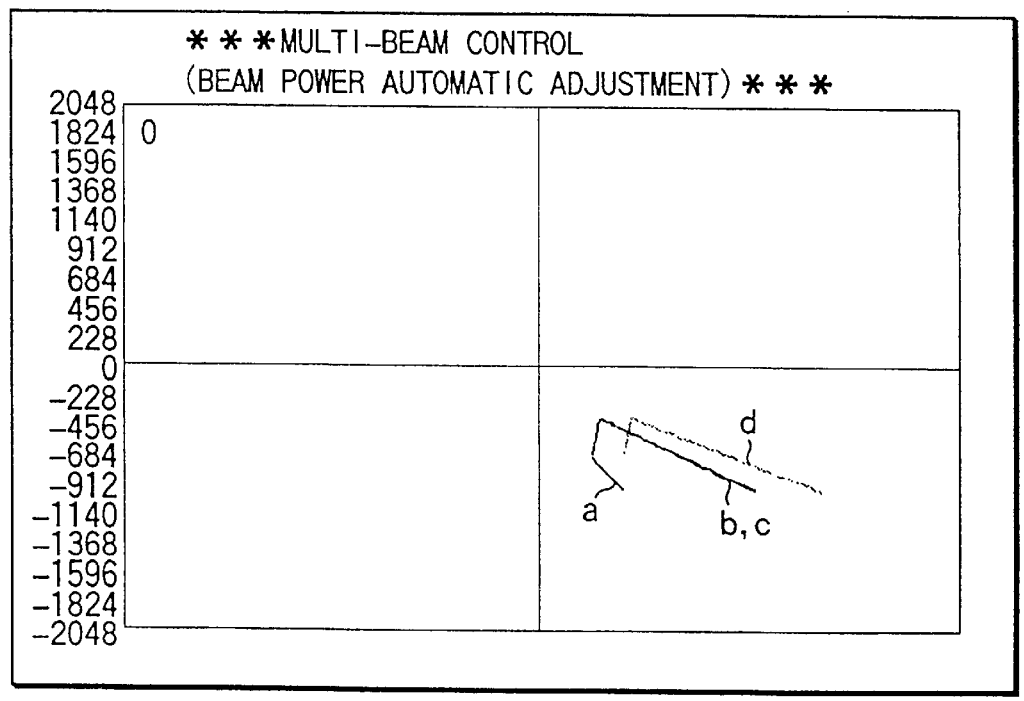
FIG. 18 shows an example of the display screen according to the third embodiment.
Figure 19:
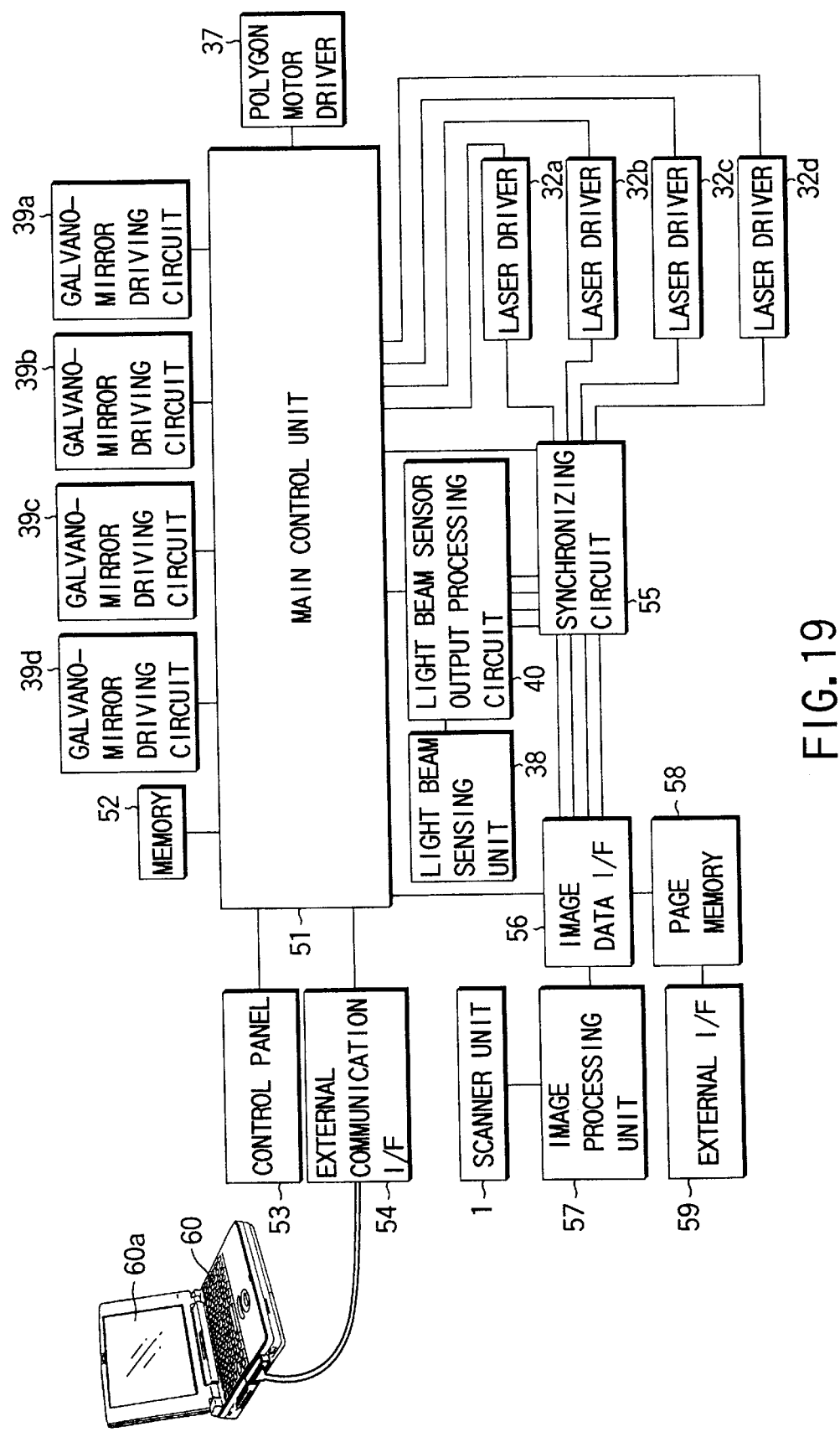
FIG. 19 is a block diagram of the important part of a fourth embodiment of the present invention.

FIG. 18 shows the state of a power (amount of light) sensing control operation. When the serviceman has selected the maintenance service mode and executed power sensing control, a screen shown in FIG. 18 appears on the display section of the control panel 53. In power control, because the output of the sensor pattern that has sensed the light beam power is inputted to the inverting input terminal of the operational amplifier A4 of the integrator 42 in FIG. 8, all of the A/D converted values are negative. In FIG. 18, the power of beam a is controlled from about −684 to −912. The power of beam b and beam c is controlled from about −684 to −456 and then to −912. The power of beam d is also controlled from about −684 to −456 and then to −912. FIG. 18 shows a case where power sensing control has been completed properly. From the figure, it can be seen that the power of each of the light beams a, b, c, and d is controlled to the same power.

Namely, from FIG. 18, it is judged that the laser oscillators and their drivers have operated properly. In the representation on the screen, if the power of any one of (or all of) the light beams a, b, c, and d differs, there is a good chance that one of the laser oscillators and its driver have malfunctioned.

The display screens of FIGS. 16, 17, and 18 are displayed in color. For example, the characteristic of light beam a is colored read, that of light beam b is colored blue, that of light beam c is colored green, and that of light beam d is colored yellow.

As described above, the third embodiment enables the serviceman to visually grasp the control state easily, which is helpful in maintenance service.

Hereinafter, a fourth embodiment of the present invention will be explained.

In the fourth embodiment, an external unit, such as a personal computer, is connected to the image forming apparatus to enable the display of the external unit to display the aforementioned light beam control state.

As personal computers are getting more compact these days, servicemen can carry notebook personal computers with them.

In maintenance service, a serviceman connects a notebook personal computer 60 to an external communication I/F 54, selects the maintenance service mode, and executes light beam passing position control. Then, the state of light beam passing position control is displayed on the display 60a of the personal computer 60, which enables the serviceman to determine whether there is any defective section.

For example, when the screen of FIG. 17 has appeared on the display 60a of the personal computer 60, the serviceman records the data onto a recording medium, such as a floppy disk, via the personal computer 60, investigates the cause, and troubleshoots the apparatus. Thereafter, he may bring the data back to the service center and store it for later use. Even if the cause of the trouble has not been identified and the apparatus has not been repaired, the serviceman may take the data back to the service center and, together with engineers, investigate the cause of the trouble.

As described above, the fourth embodiment enables the serviceman to visually check the state of light beam control easily and investigate the cause of inadequate images and take swift measures, which is helpful in maintenance service.

While in the embodiments, the present invention has been applied to the digital copying machine with the multi-beam system, it is not restricted to this. For instance, the invention may be applied to a digital copying machine with a single-beam system and further to an image forming apparatus.

As described above in detail, with the present invention, it is possible to provide a light beam scanning apparatus and an image forming apparatus which are capable of removing the effect of noise and bringing the passing position of a light beam to the control target position accurately.

Furthermore, with the present invention, it is possible to provide a light scanning apparatus and an image forming apparatus which enable control of the passing position of a light beam to converge in a short time reliably, taking into account variations in the hysteresis or sensitivity of a light beam actuator, such as a galvanomirror.

Moreover, with the present invention, it is possible to provide a method of adjusting an image forming apparatus which enables a serviceman to visually grasp the state of light beam control easily and facilitates the investigation and determination of the cause of inadequate images and therefore maintenance service.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:

means for generating a light beam;

means for reflecting said light beam to a scanning surface and making said light beam to scan said scanning surface in the main scanning direction;

means for shifting said light beam in a sub-scanning direction when said light beam is made to scan by said means for reflecting;

means for sensing a passing position in the sub-scanning direction of said light beam made by said means for reflecting;

means for controlling said means for shifting on the basis of a result of sensing at said means for sensing so that the passing position of said light beam on said scanning surface may be within a target range;

means for, after said means for controlling has brought the passing position of the light beam on said scanning surface into the target range, measuring the passing position of said light beam scanning said scanning surface a specific number of times using said means for sensing and judging whether all of said passing positions lie in said target range; and means for making said means for controlling to execute passing position control of the light beam again when the result of measuring said light beam passing position said specific number of times includes a value outside said target range.

2. A light beam scanning apparatus according to claim 1, wherein said means for reflecting includes a polygon mirror that rotates, and said means for measuring the passing position of said light beam and judging includes means for making said light beam to scan said scanning surface as many times as the number of faces of said polygon mirror, taking the average of the results of sensing at said means for sensing in the respective scans, and judging whether the average is within said target range.

3. A light beam scanning apparatus according to claim 1, wherein said means for reflecting includes a polygon mirror that rotates, and said means for measuring the passing position of said light beam and judging includes means for making said light beam to scan said scanning surface as many times as the number of faces of said polygon mirror, taking the average of the results of sensing at said means for sensing in the respective scans, and judging whether all of a specific number of the averages obtained by rotating said polygon mirror the specific number of times are within said target range.

4. A light beam scanning apparatus according to claim 1, further comprising:

means for, after said means for measuring the passing position of said light beam and judging has judged whether all of said passing positions are within said target range, driving said means for generating and means for reflecting on the basis of an inputted target image data item so as to scan said scanning surface.

5. A light beam scanning apparatus according to claim 1, wherein said means for controlling includes means for bringing the passing position of said light beam into a final target range in such a manner that said target range is forced to converge stepwise in a first range and then in a second range narrower than said first range.

6. A light beam scanning apparatus comprising:

a plurality of means for generating light beams;

means for optically combining the light beams generated at said plurality of means for generating light beams and then reflecting the resulting beams to a scanning surface and making said light beams to scan said scanning surface in the main scanning direction;

a plurality of means for shifting said light beam in a sub-scanning direction when said light beam is made to scan by said means for optically combining;

a plurality of means for sensing passing positions in the sub-scanning direction of said light beams made by said means for optically combining to scan said scanning surface;

means for controlling said plurality of means for shifting on the basis of the result of sensing at said means for sensing passing positions so that the passing position of each of said light beams on said scanning surface may be within a target range;

means for, after said means for controlling has brought the passing positions of said light beams on said scanning surface into said target range, measuring the passing position of each of said light beams scamning said scanning surface a specific number of times using said means for sensing passing positions and judging whether all of said passing positions of said light beams lie in said target range; and means for making said means for controlling to execute passing position control of said light beams again when the result of measuring said light beam passing position of each of said light beams said specific number of times includes a value outside said target range.

7. A light beam scanning apparatus according to claim 6, wherein said means for optically combining includes a polygon mirror that rotates, and said means for measuring the passing position of each of said light beams and judging includes means for making each of said light beams to scan said scanning surface as many times as the number of faces of said polygon mirror, taking the average of the results of sensing at said means for sensing passing positions in the respective scans, and judging whether the average is within said target range.

8. A light beam scanning apparatus according to claim 6, wherein
said means for optically combining includes a polygon mirror that rotates, and
said means for measuring the passing position of each of said light beams and judging includes means for making each of said light beams to scan said scanning surface as many times as the number of faces of said polygon mirror, taking the average of the results of sensing at said means for sensing passing positions in the respective scans, and judging whether all of a specific number of the averages obtained by rotating said polygon mirror the specific number of times are within said target range.

9. A light beam scanning apparatus according to claim 6, further comprising:
means for, after said means for measuring the passing position of each of said light beams and judging has judged whether all of said passing positions of said light beams are within said target range, driving said plurality of means for generating light beams and scanning means on the basis of an inputted target image data item so as to scan said scanning surface.

10. A light beam scanning apparatus according to claim 6, wherein said means for controlling includes means for bringing the passing position of each of said light beams into a final target range in such a manner that said target range is forced to converge stepwise in a first range and then in a second range narrower than said first range.

11. An image forming apparatus which makes light beams to scan and expose an image retaining member and thereby forms an image on said image retaining member, said image forming apparatus comprising:
a plurality of means for generating light beams;
means for optically combining the light beams generated at said plurality of means for generating light beams and then reflecting the resulting beams to a scanning surface and making said light beams to scan said scanning surface in the main scanning direction;
a plurality of means for shifting said light beam in a sub-scanning direction when said light beam is made to scan by said means for optically combining;
a plurality of means for sensing passing positions in the sub-scanning direction of said light beams made by means for optically combining to scan said scanning surface;
means for controlling said plurality of means for shifting on the basis of the result of sensing at said means for sensing so that the passing position of each of said light beams on said scanning surface may be within a target range;
means for, after said means for controlling has brought the passing positions of said light beams on said scanning surface into said target range, measuring the passing position of each of said light beams scanning said scanning surface a specific number of times using said means for sensing and judging whether all of said passing positions of said light beams lie in said target range;
means for making said means for controlling to execute passing position control of said light beams again when the result of measuring said light beam passing position of each of said light beams said specific number of times includes a value outside said target range; and
means for, after said means for measuring the passing position of each of said light beams and judging has judged that all of said passing positions of said light beams are within said target range, driving said plurality of means for generating light beams and said means for optically combining on the basis of an inputted target data item and forming an image on said scanning surface.

12. An image forming apparatus according to claim 11, wherein
said means for optically combining includes a polygon mirror that rotates, and
said means for measuring, the passing position of each of said light beams and judging includes means for making each of said light beams to scan said scanning surface as many times as the number of faces of said polygon mirror, taking the average of the results of sensing at said means for sensing in the respective scans, and judging whether all of a specific number of the averages obtained by rotating said polygon mirror the specific number of times are within said target range.

13. An image forming apparatus according to claim 11, wherein said means for controlling includes means for bringing the passing position of each of said light beams into a final target range in such a manner that said target range is forced to converge stepwise in a first range and then in a second range narrower than said first range.

14. An image forming apparatus according to claim 11, further comprising:
means for setting said apparatus to a maintenance service mode to provide maintenance service including light beam scanning position control; and
means for displaying the controlled state of said light beam in the maintenance service mode.

15. An image forming method of making light beams to scan and expose an image retaining member and thereby forming an image on said image retaining member, said image forming method comprising the following:
optically combining light beams generated by a light beam generator and making a polygon mirror to reflect the resulting beams to a scanning surface and then making said light beams to scan said scanning surface in the main scanning direction;
making a plurality of light sensors sense passing positions of said light beams;
shifting said light beams independently in the sub-scanning direction on the basis of the result of sensing in said sensing step so that the passing position of each of said light beams on said scanning surface may be within a target range;
after the passing positions of each of said light beams have been brought into said target range, measuring the passing positions of said light beams scanning said scanning surface a specific number of times using said plurality of light sensors and judging whether all of said passing positions of said light beams lie in said target range; and
bringing the passing position of each of said light beams into said target range again when the result of measuring said light beam passing position of each of said light beams said specific number of times includes a value outside said target range.

16. An image forming method according to claim 15, wherein said judging step includes making each of said light beams to scan said scanning surface as many times as the number of faces of said polygon mirror, taking the average of the results of sensing the passing positions in the respective scans, and judging whether all of a specific number of the averages obtained by rotating said polygon mirror the specific number of times are within said target range.

17. An image forming method according to claim 15, wherein said shifting step includes bringing the passing position of each of said light beams into a final target range in such a manner that said target range is forced to converge stepwise in a first range and then in a second range narrower than said first range.

* * * * *